(12) United States Patent
Erez et al.

(10) Patent No.: US 10,536,200 B2
(45) Date of Patent: Jan. 14, 2020

(54) METHOD FOR PROCESSING RECEIVED SIGNALS

(71) Applicant: RAMOT AT TEL-AVIV UNIVERSITY LTD., Tel-Aviv (IL)

(72) Inventors: Uri Erez, Tel Aviv (IL); Elad Domanovitz, Tel Aviv (IL)

(73) Assignee: RAMOT AT TEL AVIV UNIVERSITY LTD, Tel Aviv (IL)

( * ) Notice: Subject to any disclaimer, the term of this patent is extended or adjusted under 35 U.S.C. 154(b) by 0 days.

(21) Appl. No.: 16/164,799

(22) Filed: Oct. 19, 2018

(65) Prior Publication Data

US 2019/0132030 A1 May 2, 2019

Related U.S. Application Data

(60) Provisional application No. 62/683,071, filed on Jun. 11, 2018, provisional application No. 62/579,168, filed on Oct. 31, 2017.

(51) Int. Cl.
| | |
|---|---|
| *H04B 7/0417* | (2017.01) |
| *H04B 7/06* | (2006.01) |
| *H04L 1/00* | (2006.01) |
| *H04L 25/03* | (2006.01) |
| *H01Q 3/26* | (2006.01) |

(52) U.S. Cl.
CPC ......... *H04B 7/0417* (2013.01); *H01Q 3/2605* (2013.01); *H04B 7/0634* (2013.01); *H04L 1/0029* (2013.01); *H04L 25/03343* (2013.01)

(58) Field of Classification Search
CPC .. H04B 7/0413; H04B 7/0417; H04B 7/0634; H04B 7/12; H04L 25/03343; H04L 1/0029; H04L 1/0618; H01Q 3/2605
See application file for complete search history.

(56) References Cited

U.S. PATENT DOCUMENTS

| | | | |
|---|---|---|---|
| 2003/0048861 A1* | 3/2003 | Kung | H04B 7/0854 375/347 |
| 2018/0269932 A1* | 9/2018 | Lee | H04B 7/0413 |

* cited by examiner

*Primary Examiner* — David S Huang
(74) *Attorney, Agent, or Firm* — Reches Patents

(57) ABSTRACT

A method that may include receiving, by multiple antennas of a receiver, received signals that are received with diversity and represent transmitted signals; and processing, by at least one processor of the receiver, the received signals to provide processed signals that are indicative of the transmitted signals; wherein the processing comprises applying a dimension-reducing process. The dimension-reducing process may be channel independent.

27 Claims, 41 Drawing Sheets

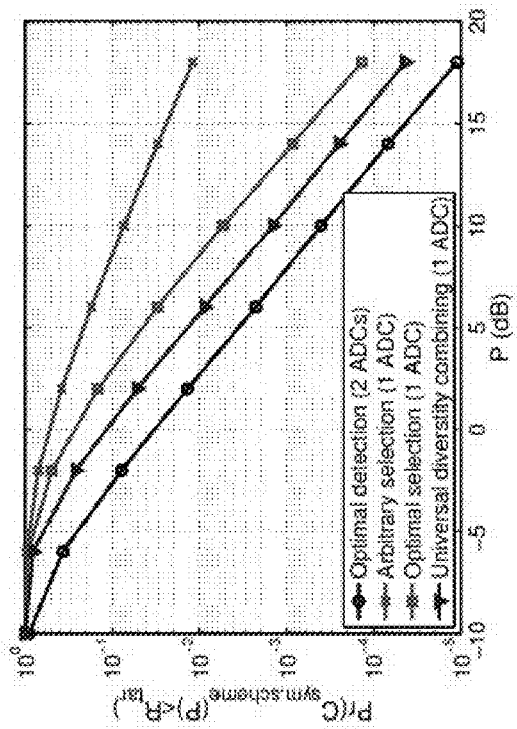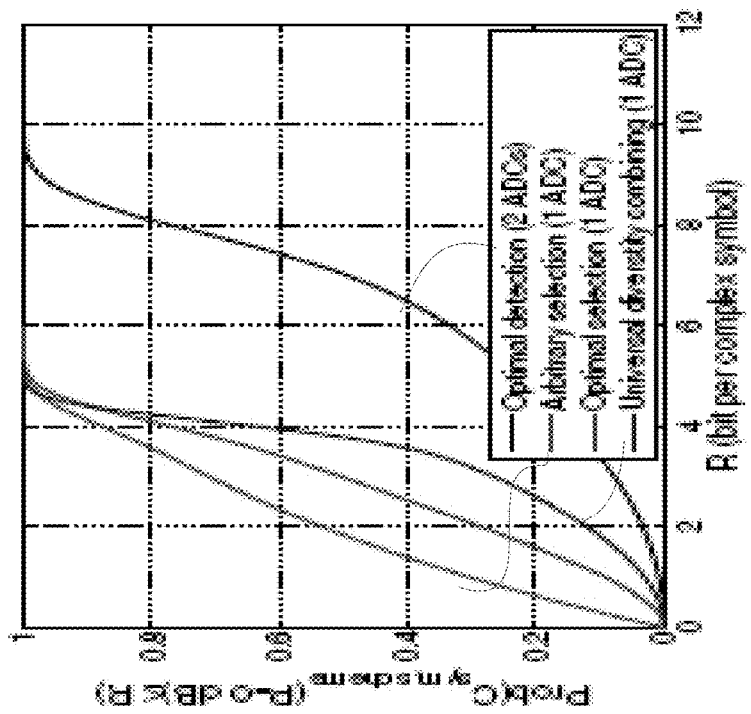
FIG. 6

$$s_i(t) = h_i x(t) + n_i(t). \quad (1)$$

$$\mathbf{s} = [s_{1R}(1) \, s_{1I}(1) \, s_{2R}(1) \, s_{2I}(1) \, s_{1R}(2) \, s_{1I}(2) \, s_{2R}(2) \, s_{2I}(2)]^T, \quad (2)$$

$$\mathbf{x} = [x_R(1) \, x_I(1) \, x_R(2) \, x_I(2)]^T. \quad (3)$$

$$P = \frac{1}{\sqrt{2}} \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 1 & 0 \\ 0 & 0 & 0 & -1 \\ -1 & 0 & 0 & 0 \\ 0 & 1 & 0 & 0 \end{bmatrix} \quad (4)$$

$$\mathbf{u} = U(h_1, h_2)\mathbf{x} + P\mathbf{n}$$
$$= U(h_1, h_2)\mathbf{x} + \mathbf{n}', \quad (5)$$

$$U(h_1, h_2) = \frac{1}{\sqrt{2}} \begin{bmatrix} h_{1R} & -h_{1I} & h_{2R} & -h_{2I} \\ h_{1I} & h_{1R} & h_{2I} & -h_{2R} \\ h_{2R} & -h_{2I} & -h_{1R} & h_{1I} \\ h_{2I} & h_{2R} & -h_{1I} & h_{R1} \end{bmatrix}, \quad (6)$$

$$U^H(h_1, h_2) U(h_1, h_2) = \|\mathbf{h}\|^2 \cdot I, \quad (7)$$

FIG. 14

$$\mathbf{y} = \begin{bmatrix} y_1(t=1) \\ y_2(t=1) \\ y_1(t=2) \\ y_2(t=2) \end{bmatrix} = Q[\mathbf{u}], \quad (8)$$

$$\mathbf{e} = \mathbf{u} - \mathbf{y} \quad (9)$$
$$= \mathbf{u} - Q(\mathbf{u}). \quad (10)$$

$$\hat{\mathbf{x}} = \begin{bmatrix} x_R(t=1) \\ x_I(t=1) \\ x_R(t=2) \\ x_I(t=2) \end{bmatrix} \quad (11)$$

$$\hat{\mathbf{x}} = \frac{1}{\|\mathbf{h}\|} U(h_1, h_2)^H \mathbf{y}. \quad (12)$$

$$\hat{\mathbf{x}} = \frac{1}{\|\mathbf{h}\|} U(h_1, h_2)^H (\mathbf{u} - \mathbf{e}) \quad (13)$$
$$= \frac{1}{\|\mathbf{h}\|} U(h_1, h_2)^H (U(h_1, h_2)\mathbf{x} + \mathbf{n}' - \mathbf{e})$$
$$= \frac{\|\mathbf{h}\|}{\sqrt{2}} \mathbf{x} + \mathbf{n}'' - \mathbf{e}', \quad (14)$$

FIG. 15

$$P_e \sim SNR^{-d} \quad (15)$$

$$y_{MRC} = \|\mathbf{h}\| x + n, \quad (16)$$

$$y_{SC} = \max(|h_1|, |h_2|) x + n, \quad (17)$$

$$y_{ST} = \frac{\|\mathbf{h}\|}{\sqrt{2}} x + n. \quad (18)$$

$$s^i(t) = h_{11}^i \cdot x_1(t) + h_{12}^i \cdot x_2(t) + n_1^i(t), \quad (19)$$

$$G = \begin{bmatrix} h_{11}^1 & h_{12}^1 \\ h_{11}^2 & h_{12}^2 \end{bmatrix}, \quad (20)$$

$$\begin{bmatrix} x_1(t) \\ x_2(t) \end{bmatrix} = G^{-1} \mathbf{y}, \quad (21)$$

$$s_j^i(t) = h_{j1}^i \cdot x_1(t) + h_{j2}^i \cdot x_2(t) + n_j^i(t), \quad (22)$$

FIG. 16

$$H^i = \begin{bmatrix} h_{11}^i & h_{12}^i \\ h_{21}^i & h_{22}^i \end{bmatrix}. \quad (23)$$

$$\mathbf{u}^i = U(h_{11}^i, h_{21}^i)\mathbf{x}_1 + U(h_{12}^i, h_{22}^i)\mathbf{x}_2 + \mathbf{n}'^i, \quad (24)$$

$$\begin{bmatrix} \mathbf{u}^1 \\ \mathbf{u}^2 \end{bmatrix} = \underbrace{\begin{bmatrix} U(h_{11}^1, h_{21}^1) & U(h_{12}^1, h_{22}^1) \\ U(h_{11}^2, h_{21}^2) & U(h_{12}^2, h_{22}^2) \end{bmatrix}}_{G} \begin{bmatrix} \mathbf{x}_1 \\ \mathbf{x}_2 \end{bmatrix} + \begin{bmatrix} \mathbf{n}'^1 \\ \mathbf{n}'^2 \end{bmatrix} \quad (25)$$

FIG. 17

$$\mathbf{u} = \frac{1}{\sqrt{8}} U(h_1, h_2, h_3, h_4) \mathbf{x} + P\mathbf{n} \quad (27)$$

$$= \frac{1}{\sqrt{8}} U(h_1, h_2, h_3, h_4) \mathbf{x} + \mathbf{u}'$$

$$U(h_1, h_2, h_3, h_4) = \begin{bmatrix} h_{1R} & h_{1I} & h_{2R} & h_{2I} & h_{3R} & h_{3I} & h_{4R} & h_{4I} \\ -h_{1I} & h_{1R} & -h_{2I} & h_{2R} & -h_{3I} & h_{3R} & -h_{4I} & h_{4R} \\ h_{2R} & h_{2I} & -h_{1R} & -h_{1I} & h_{4R} & h_{4I} & -h_{3R} & -h_{3I} \\ -h_{2I} & h_{2R} & h_{1I} & -h_{1R} & -h_{4I} & h_{4R} & h_{3I} & -h_{3R} \\ h_{3R} & h_{3I} & -h_{4R} & -h_{4I} & -h_{1R} & -h_{1I} & h_{2R} & h_{2I} \\ -h_{3I} & h_{3R} & h_{4I} & -h_{4R} & h_{1I} & -h_{1R} & -h_{2I} & h_{2R} \\ h_{4R} & h_{4I} & h_{3R} & h_{3I} & -h_{2R} & -h_{2I} & -h_{1R} & -h_{1I} \\ -h_{4I} & h_{4R} & -h_{3I} & h_{3R} & h_{2I} & -h_{2R} & h_{1I} & -h_{1R} \end{bmatrix}^T \quad (28)$$

FIG. 19

$$\tilde{s}_i(t) = d_i \cdot s_i(t), \quad (29)$$

$$\tilde{\mathbf{u}} = \frac{1}{\sqrt{8}} P \tilde{\mathbf{s}} \quad (30)$$

$$\tilde{\mathbf{u}} = \frac{1}{\sqrt{8}} U(d_1 h_1, d_2 h_2, d_3 h_3, d_4 h_4) \mathbf{x} + \mathbf{n}'' \quad (31)$$

$$\underbrace{\begin{bmatrix} \mathbf{u} \\ \tilde{\mathbf{u}} \end{bmatrix}}_{\mathbf{u}_{\text{eff}}} = \underbrace{\begin{bmatrix} U(h_1, h_2, h_3, h_4) \\ U(d_1 h_1, d_2 h_2, d_3 h_3, d_4 h_4) \end{bmatrix}}_{\mathcal{F}} \mathbf{x} + \begin{bmatrix} \mathbf{n}' \\ \mathbf{n}'' \end{bmatrix} \quad (32)$$

$$\mathbf{y} = Q(\mathbf{u}_{\text{eff}}). \quad (33)$$

FIG. 20

Fig. 7. Outage probability of mutual information for i.i.d. Rayleigh fading with $R_{tar} = 4$, $P_s = 20$ dB, $P_r = 0$ dB, as a function of the total number of relays (the number $M'$ of active ones being random).

Fig. 8. Outage probability for uncoded QPSK transmission for i.i.d. Rayleigh fading channel with $P_x = 20$ dB, $P_r = 0$ dB, as a function of the total number of relays $M$ (the number of active ones $M'$ being random).

$$r_i(t) = h_i^{s \to r} x(t) + n_i(t), \quad (1)$$

$$\mathrm{SNR}^{s \to r} \triangleq P_s. \quad (2)$$

$$\mathbf{h}_i \triangleq \mathbf{h}_i^{r \to d} \triangleq \begin{bmatrix} h_{1i} & h_{2i} & \cdots & h_{N_r i} \end{bmatrix}^T, \quad (3)$$

$$\mathbf{y}(t) = \sum_{i=1}^{M} \mathbf{h}_i x_i(t) + \mathbf{n}(t), \quad (4)$$

$$\mathrm{SNR}^{r \to d} \triangleq P_r. \quad (5)$$

$$x_i(t) = g_i x(t), \quad t = 1, \ldots, T. \quad (5.1)$$

FIG. 29

$$\mathbf{y}(t) = \sum_{i=1}^{M'} \mathbf{h}_i g_i x(t) + \mathbf{n}(t). \quad (6)$$

$$\alpha \triangleq \sqrt{P_r/P_s}. \quad (6.1)$$

$$I(\mathrm{SNR}_{\mathrm{scheme}}) \triangleq \log(1 + \mathrm{SNR}_{\mathrm{scheme}}). \quad (7)$$

$$\Pr(I(\mathrm{SNR}_{\mathrm{scheme}}) < R_{\mathrm{tar}}). \quad (8)$$

$$g_i = \alpha \cdot \frac{h_i^*}{|h_i|}. \quad (9)$$

$$y = \sum_{i=1}^{M'} \alpha |h_i| x + n, \quad (10)$$

FIG. 30

$$\text{SNR} = \left(\sum_{i=1}^{M'} |h_i|\right)^2 P_r. \quad (11)$$

$$g_i = \alpha \cdot \frac{h_i^*}{\|\mathbf{h}\|} \sqrt{M'}. \quad (12)$$

$$\mathbf{h}_i = \begin{bmatrix} h_{1i} & h_{2i} \end{bmatrix}^T, \quad i = 1, \ldots, M', \quad (14)$$

$$\mathbf{y}(t) = \sum_{i=1}^{M'} \mathbf{h}_i g_i x(t) + n(t). \quad (15)$$

FIG. 31

$$g_1 = \alpha \left[ \frac{h_{11}^*}{|h_{11}|} \frac{h_{12}^*}{|h_{12}|} \cdots \frac{h_{1N}^*}{|h_{1N}|} \right]^T \quad (15.1)$$

$$g_2 = \alpha \left[ \frac{h_{21}^*}{|h_{21}|} \frac{h_{22}^*}{|h_{22}|} \cdots \frac{h_{2N}^*}{|h_{2N}|} \right]^T, \quad i = 1, 2. \quad (16)$$

$$SNR_i = \left( \sum_{k=1}^{M'} |h_{i,k}| \right)^2 P_r, \quad i = 1, 2.$$

$$SNR = \max_{i=1,2} SNR_i. \quad (17)$$

FIG. 32

$$\text{SNR} = \max_i \|\mathbf{h}_i\|^2 P_r \quad (18)$$

$$\text{SNR} = \max_i \|\mathbf{h}_i\|^2 M' P_r \quad (19)$$

$$\mathbf{H} = \mathbf{U}\mathbf{D}\mathbf{V}^H, \quad (20)$$

$$g_i = a \mathbf{U}^*_{i,j}\sqrt{M'}, \quad s.t. \ j = \arg\max_{m=1,2} d_m. \quad (21)$$

$$\text{SNR} = d^2_{\max} M' P_r. \quad (22)$$

$$s_i(t) = h_i x(t) + n_i(t). \quad (23)$$

FIG. 33

$$s = [s_{1R}(1) s_{1I}(1) s_{2R}(1) s_{2I}(1) s_{1R}(2) s_{1I}(2) s_{2R}(2) s_{2I}(2)]^T,\quad (24)$$

$$x = [x_R(1) x_I(1) x_R(2) x_I(2)]^T.\quad (25)$$

$$y = Gs \quad (26)$$

$$G = \frac{1}{\sqrt{2}}\begin{bmatrix} 1 & 0 & 0 & 0 & 0 & 0 & 1 & 0 \\ 0 & 1 & 0 & 0 & 0 & 0 & 0 & -1 \\ 0 & 0 & 1 & 0 & -1 & 0 & 0 & 0 \\ 0 & 0 & 0 & 1 & 0 & 1 & 0 & 0 \end{bmatrix} \quad (27)$$

FIG. 34

$$y = \frac{\|\mathbf{h}\|}{\sqrt{2}} \mathbf{U}(h_1, h_2) \mathbf{x} + \mathbf{Gn}$$
$$= \frac{\|\mathbf{h}\|}{\sqrt{2}} \mathbf{U}(h_1, h_2) \mathbf{x} + \mathbf{n}', \quad (28)$$

$$\mathbf{U}(h_1, h_2) = \frac{1}{\|\mathbf{h}\|} \begin{bmatrix} h_{1R} & -h_{1I} & h_{2R} & -h_{2I} \\ h_{1I} & h_{1R} & h_{2I} & h_{2R} \\ h_{2R} & -h_{2I} & -h_{1R} & h_{1I} \\ h_{2I} & h_{2R} & -h_{1I} & -h_{1R} \end{bmatrix} \quad (29)$$

$$\hat{\mathbf{x}} = \mathbf{U}^T(h_1, h_2) \cdot \mathbf{y}$$
$$= \frac{\|\mathbf{h}\|}{\sqrt{2}} \mathbf{x} + \mathbf{n}'' \quad (30)$$

FIG. 35

$$y = \sum_{i=1}^{K} \mathbf{H}_i \mathbf{x}_i + \mathbf{n} \quad (31)$$

$$y = \sum_{i=1}^{K} \frac{\|\mathbf{h}_{2i}\|}{\sqrt{2}} \mathbf{U}(h_{1i}, h_{2i}) \mathbf{x}_i + \mathbf{n}', \quad (32)$$

$$\tilde{\mathbf{x}}_i = \alpha \mathbf{U}(h_{1i}, h_{2i})^H \mathbf{x} \quad (33)$$

FIG. 36

$$y = \sum_{i=1}^{M'} \alpha \frac{\|\mathbf{h}_i\|}{\sqrt{2}} \mathbf{U}(h_{1i}, h_{2i}) \tilde{\mathbf{x}}_i + \mathbf{n}'$$

$$y = \sum_{i=1}^{M'} \alpha \frac{\|\mathbf{h}_i\|}{\sqrt{2}} \mathbf{U}(h_{1i}, h_{2i}) \mathbf{U}(h_{1i}, h_{2i})^H \mathbf{x} + \mathbf{n}'$$

$$y = \sum_{i=1}^{M'} \alpha \frac{\|\mathbf{h}_i\|}{\sqrt{2}} \mathbf{x} + \mathbf{n}'. \quad (34)$$

$$\mathrm{SNR} = \frac{\left(\sum_{i=1}^{M'} \|\mathbf{h}_i\|\right)^2}{2} P_r. \quad (35)$$

FIG. 37

$$\text{SNR} = \left(\sum_{i=1}^{M'} \sqrt{\frac{|h_{1i}|^2 + |h_{2i}|^2}{2}}\right)^2 P_r. \quad (36)$$

$$\text{SNR} = \left(\sum_{i=1}^{M'} |h_{1i}|\right)^2 P_r. \quad (37)$$

FIG. 38

| Scheme | Distributed | Power constraint | CSI at relays | Low latency | SNR |
|---|---|---|---|---|---|
| Arbitrary antenna selection | Yes | Per antenna | Local | Yes | $\left(\sum_{k=1}^{M'} |h_{A,k}|\right)^2 P_r$ |
| Optimal antenna selection | Partial | Per antenna | Full (or local+1-bit feedback) | No | $\max_i \left(\sum_{k=1}^{M'} |h_{i,k}|\right)^2 P_r$ |
| Opportunistic relaying | Yes | Per antenna | Local | Yes | $\max_i \|\mathbf{h}_i\|^2 P_r$ |
| Opportunistic relaying, sum power | No | Sum power | Local | Yes | $\max_i \|\mathbf{h}_i\|^2 M' P_r$ |
| Centralized beamforming | No | Sum power | Full (or receiver feedback) | No | $d_{max}^2 M' P_r$ |
| Unitary orthogonal combining | Yes | Per Antenna | Local | Yes | $\dfrac{\left(\sum_{i=1}^{M'} \|\mathbf{h}_i\|\right)^2 P_r}{2}$ |

METHOD FOR PROCESSING RECEIVED SIGNALS

CROSS REFERENCE

This application claims priority from US provisional patent Ser. No. 62/579,168 filing fate Oct. 31, 2017 and US provisional patent Ser. No. 62/683,071 filing date Jun. 11, 2018.

BACKGROUND

There is a growing need to improve communication schemes.

SUMMARY

In wireless communication, diversity methods play a central role in combating the detrimental effects of severe channel variation (fading). Of the many techniques have been developed over the years with this goal, an important subclass involves the use of multiple receive antennas. With sufficient separation between the antennas, each antenna may be viewed as a branch receiving the transmitted signal multiplied by an approximately independent fading coefficient. Diversity is achieved since the probability that the signal is severely affected by fading on all branches simultaneously is greatly reduced. The number of such (roughly) independent branches is commonly referred to as the diversity order.

There may be provided a method that may include receiving, by multiple reception elements of a receiver, received signals that are received with diversity and represent signals that originated from a signal source; and processing, by at least one processor of the receiver, the received signals to provide processed signals that are indicative of the signals that originated from the signal source; wherein the processing comprises performing a dimension-reducing process that is channel independent on a set of signals received at multiple points of time by each reception element of the multiple reception elements.

There may be provided a non-transitory computer readable medium that stores instructions that once executed by a receiver causes the receiver to: receive, by multiple reception elements, received signals that are received with diversity and represent signals that originated from a signal source; and process, by at least one processor, the received signals to provide processed signals that are indicative of the signals that originated from the signal source; wherein the processing comprises performing a dimension-reducing process that is channel independent on a set of signals received at multiple points of time by each reception element of the multiple reception elements.

There may be provided a receiver, that may include: multiple reception elements that are configured to receive, received signals that are received with diversity and represent signals that originated from a signal source; and at least one processor that is configured to process the received signals to provide processed signals that are indicative of the signals that originated from the signal source; wherein the processing may include performing a dimension-reducing process that is channel independent on a set of signals received at multiple points of time by each reception element of the multiple reception elements.

The performing of the dimension reduction process may include applying linear operations that may be channel independent.

The dimension reducing process may be a dimension reducing linear space-time process.

The dimension reducing process may be a dimension reducing semi-orthogonal linear space-time process.

The dimension reducing process may be a dimension reducing space-frequency process.

The performing of the dimension reduction process may include applying a dimension reduction matrix that may be channel independent.

The transpose of the dimension reduction matrix represents a linear operation performed by an Alamouti modulation, expressed over real values, applied to the received signals.

For a set of signals of two points in time and for two reception elements the dimension reduction matrix has four rows and eight columns, wherein the first row includes 1/sqr(2), 0, 0, 0, 0, 0, 1/sqr(2), 0; wherein the second row includes 0, 1/sqr(2), 0, 0, 0, 0, 0, −1/sqr(2); wherein the third row includes 0, 0, 1/sqr(2), 0, −1/sqr(2), 0, 0, 0; and wherein the fourth row includes 0, 0, 0, 1/sqr(2), 0, 1/sqr(2), 0, and 0.

For a set of signals of two points in time and for two reception elements the dimension reduction matrix equals a multiplication by at least one orthogonal matrix by a matrix that has four rows and eight columns, wherein the first row includes 1/sqr(2), 0, 0, 0, 0, 0, 1/sqr(2), 0; wherein the second row includes 0, 1/sqr(2), 0, 0, 0, 0, 0, −1/sqr(2); wherein the third row includes 0, 0, 1/sqr(2), 0, −1/sqr(2), 0, 0, 0; and wherein the fourth row includes 0, 0, 0, 1/sqr(2), 0, 1/sqr(2), 0, and 0. The multiplication by the one or more orthogonal matrix can be from the left, from the right or both from the left and from the right.

For a set of signals of two points in time and for two reception elements the dimension reduction operation may be done over the complex field.

The performing of the dimension reduction process may include applying linear operations and conjunction operations that may be channel independent.

For a set of signals that may include of two points in time and for two reception elements the applying linear operations and conjunction operations may include (a) summing a signal received by a first reception element at a first point of time with a conjunction of a signal received by a second reception element at a second point of time, and (b) subtracting from a signal received by the second reception element at the first point of time, a conjunction of a signal received by the first reception element at a second point of time.

The multiple reception elements of the receiver may be multiple antennas and wherein the signals that originated from the signal source may be transmitted signals.

The multiple antennas may consists of a pair of antennas.

The multiple antennas may include more than two antennas.

The processing may include performing analog to digital conversion.

The analog to digital conversion may be executed by a group of at least one analog to digital converter; wherein a number of analog to digital converters of the group may be smaller than a number of the multiple antennas.

The preforming of the analog to digital conversion may precede the applying of the dimension-reducing space-time process.

The applying of the dimension-reducing space-time process starts before the preforming of the analog to digital conversion.

The set of signals may have a first number (N1) of real and imaginary parts of the received signals that were received at the multiple points in time; and wherein the receiver may be configured to multiplying the set of signals by the dimension reducing matrix to provide a reduced set of signals that has a second number (N2) of intermediate signals; wherein N1 exceeds N2; wherein the dimension reduction matrix has orthogonal rows.

The receiver may be configured to analog to digital converting the intermediate signals to provide the processed signals.

The receiver may be configured to reconstructing, by the receiver, the signals that originated from the signal source based on the processed signals.

The receiver may be configured to reconstruct, by a computerized system that differs from the receiver, the signals originated from a signal source based on the processed signals.

The receiver may be configured to perform analog to digital conversion to the intermediate signals to provide digital signals; and reconstruct the signals to provide the processed signals, based on the digital signals.

The receiver may be configured to apply a dimension reduction matrix the at a digital domain of the receiver.

The receiver may be configured to apply a dimension reduction matrix the at an analog domain of the receiver.

The receiver may be configured to perform analog to digital converting the processed signals to provide digital processed signals.

The receiver may be configured to send the digital processed signals to device that does not include the receiver.

The receiver may be configured to process the digital processed signals by the receiver to reconstruct the signals that originated from the signal source based on the processed signals There may be provided a system that includes the receiver and one or more relay units. The relay unit may be configured to estimate channels between a relay unit and the receiver to provide channel estimates. The relay unit may be configured to receive intermediate signals that represent the signals that originated from the signal source, process the intermediate signals based on the channel estimates to provide relay processed signals; and transmit the relay processed signals to the receiver.

The multiple reception elements may be multiple antennas. The estimating of the channels between the relay unit and the receiver may include receiving from the multiple antennas and by the relay unit, a beacon signal of known parameters; and processing the beacon signal to estimate the channels between the relay unit and the receiver.

The one or more relay units may be relay units. The relay units may be configured to estimate channels between relay units and the receiver to provide channel estimates; receive intermediate signals that represent the signals that originated from the signal source; process the intermediate signals based on the channel estimates to provide relay processed signals; and transmit the relay processed signals to the receiver.

Each relay unit may be configured to estimate the channel from itself to the destination.

Each relay unit may be configured to estimate the channel from itself to the destination invoking the electromagnetic reciprocity principle by utilizing a beacon signal of known parameters.

Following a processing by each relay unit, the channel between the relay units and the receiver, after applying the dimension reduction transformation, may be represented by a scaled identity matrix.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings of in which:

FIG. 6 is an example of bit error rates of various receivers;
FIGS. 14-20 illustrate equations;
FIGS. 29-38 illustrate equations;
FIG. 39 illustrates a table;
FIG. 40 illustrates equations.

DETAILED DESCRIPTION OF THE DRAWINGS

Figure 1:
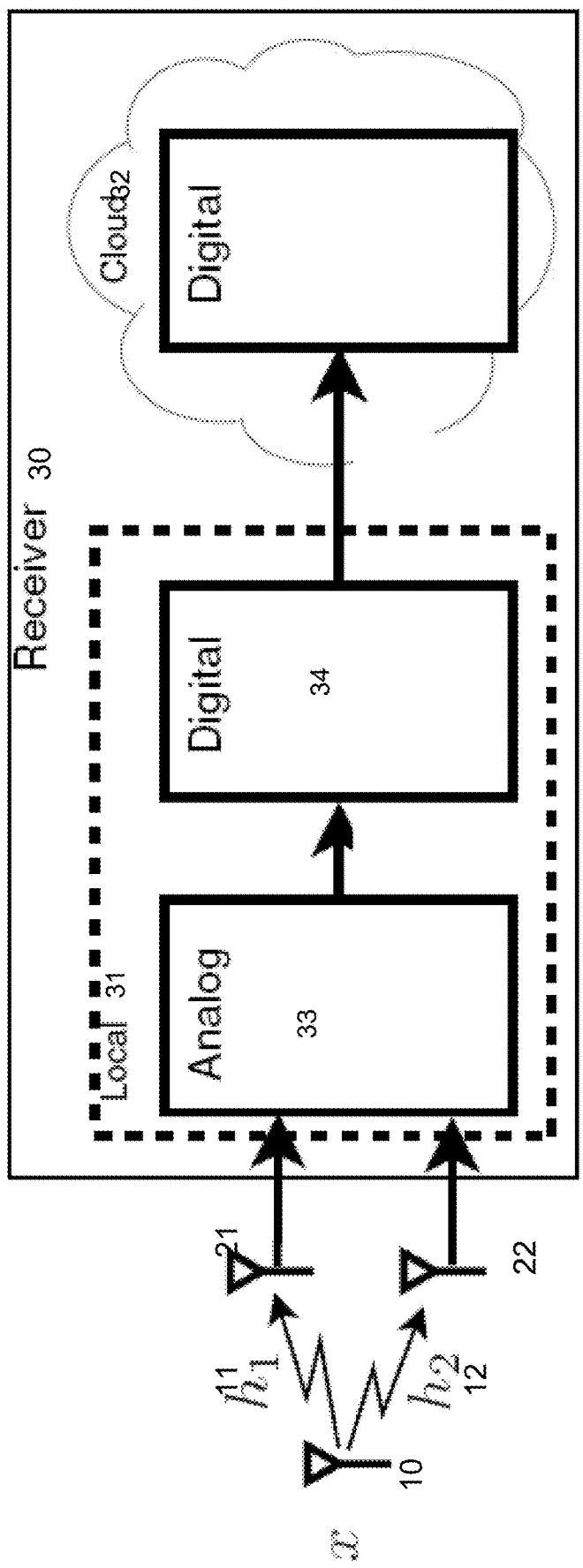
FIG. 1 is an example of a receiver.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Optimal diversity combining may be attained by what is called a maximum ratio combiner which however requires advanced signal processing and a multiple RF chains, one connected to each antenna. Complexity may be reduced somewhat using an "equal weight combiner" while retaining the optimal diversity order. A widely used technique that also supports optimal diversity order but utilizes only a single RF channel is that of "antenna selection" combining. The main drawback of this method is that it needs to switch between the different antennas based on the fluctuations in the measured SNR values at the individual antennas, a mechanism that may be well-suited to small low-power devices.

There may be provided a receiver that may achieve an optimal diversity order with a single RF chain while doing away with the need for switching.

Specifically, the outputs of all of the antennas are (at all times) connected a single RF chain and A/D unit where diversity is attained by using a judiciously chosen combining matrix which operates on samples taken over both space and time.

To understand the potential benefits as well as the general nature of the contribution, consider a receiver as depicted in FIG. 1. Transmitter 10 transmits signals via first and second channels 11 and 12 and are received by first and second antennas 21 and 21 of receiver 30. Receiver 30 has local part 31 and remote part 32. The local part has analog part 33 and digital part 34.

A key feature of modern device architectures is the decomposition of the unit into separate functional blocks (which can be located at different physical locations, i.e., distributed processing). These blocks are connected by interfaces and a major design goal is to reduce the bandwidth between different blocks.

The scheme proposed can assist both in the interface from the analog domain to the digital, simplifying analog-to-digital (A/D) conversion and thus also reducing power consumption; it may also assist in reducing the bandwidth of the digital interface between different digital blocks. For example, in a centralized (cloud) radio access network (C-RAN) setting, this bandwidth reduction will be in the fronthaul links between the relays (RRH units) and the central (cloud) processing unit.

We begin by describing the scheme in the most basic setup of a single-input multiple-output (SIMO) system with only two receive antennas.

Consider a 2×1 SIMO channel as depicted in FIG. 1. The signal received at antenna i=1, 2, at discrete time t is given by equation (1).

We assume that the noise $n_i(t)$ is i.i.d. over space and time with samples that are circularly-symmetric complex Gaussian with unit variance.

The scheme works on batches of two time instances and for our purposes, it will suffice to describe it for time instances t=1, 2. Let us stack these four complex samples received over T=2 time instances, two over each antenna, into an 8×1 real vector of equation (2).

Where xR and xI denote the real and imaginary parts of a complex number x. We similarly define the stacked noise vector n. Likewise, we define equation (3).

Next, we form a 4×1 real vector u by applying to the vector s the transformation u=Ps Where P (equation (4) has four rows and eight columns, wherein the first row includes 1/sqr(2), 0, 0, 0, 0, 0, 1/sqr(2), 0; wherein the second row includes 0, 1/sqr(2), 0, 0, 0, 0, 0, −1/sqr(2); wherein the third row includes 0, 0, 1/sqr(2), 0, −1/sqr(2), 0, 0, 0; and wherein the third row includes 0, 0, 0, 1/sqr(2), 0, 1/sqr(2), 0, and 0.

Note that unlike conventional linear diversity combining schemes, here the combining matrix P does not depend on the channel coefficients. In other words, it is universal.

It is not hard to show that equation (5) holds, wherein equation (6) illustrates U(h1,h2).

A key observation is that U(h1, h2) is an orthogonal matrix for any h1, h2 (see equation (7)).

Where I is the identity matrix. Further, since the rows of P are orthogonal, it follows that n' is white and Gaussian with unit variance.

We next apply to s (component-wise) a scalar uniform quantizer Q(•) to obtain equation (7.1)

We denote the quantization error vector by equations (8) and (9).

The sequence of quantized samples is used to reconstruct an estimation of the source vector of equation (10) by applying the transformation of equation (11).

Using (5) and (9), we have equations (12)-(14)

Where n' has the same distribution as n.

As for the quantization error e and its transformed variant e', we may invoke the standard assumption, which may be justified using subtractive dithered quantization, that it is independent of the signal (and hence of x) and is white (i.e., its covariance matrix is the identity).

We conclude that the input/output relationship of the proposed diversity combiner is identical to that of MRC, except for a power loss of a factor of two. In other words, we attain full diversity but no array gain, precisely as in the case of Alamouti space-time diversity transmission.

Application to Analog to Digital Conversion

In this section we demonstrate the effectiveness of the scheme to A/D conversion for narrowband internet-of-things power-limited devices. The proposed method may be used to achieve maximal diversity order with a single radio-frequency (RF) chain and analog-to-digital converter, and without requiring a switching mechanism which comes at substantial analog hardware complexities.

In this section we do not explicitly consider the quantization noise as it behaves in very much the same way in all systems considered.

Consider again the scenario of a 2×1 SIMO system as depicted in FIG. 1 and described in the previous section.

We note that as the fading coefficient are constants (rather than impulse responses), the model assumed is that of frequency flat fading.

Figure 2:
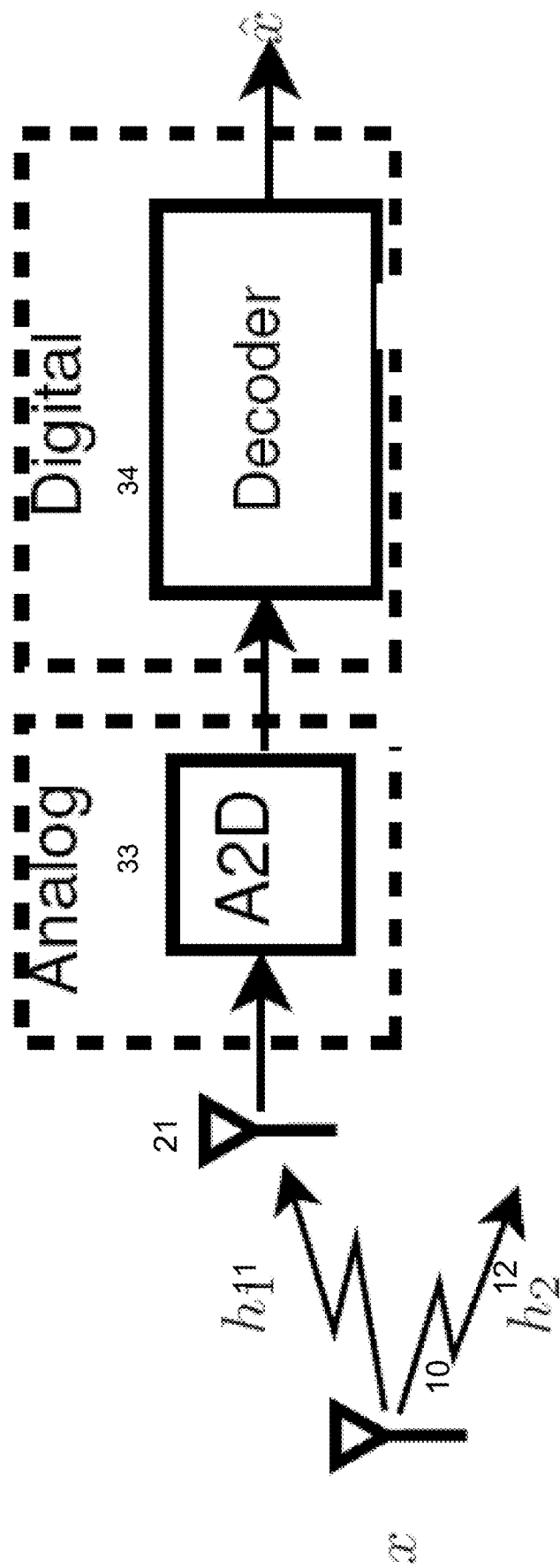
FIG. 2 is an example of a receiver.

The role of diversity is easiest to understand by assuming first that the receiver front end arbitrarily processes the output of one antenna only, say, only the output of antenna 1, as depicted in FIG. 2. Thus, only the signal s1(t) in equation (1) passes through the RF chain and a single A/D unit suffices.

The performance however is far from robust as a fade of a single channel coefficient (h1 with our arbitrary choice) will result in highly degraded signal-to-noise ratio (SNR). In a Rayleigh fading environment, the bit error rate for uncoded transmission will decay as in equation (15).

Where here d=1, and we say that we have first order diversity.

Similarly, in a system where d=2 as will be described below, we have a diversity order of 2.

Figure 3:
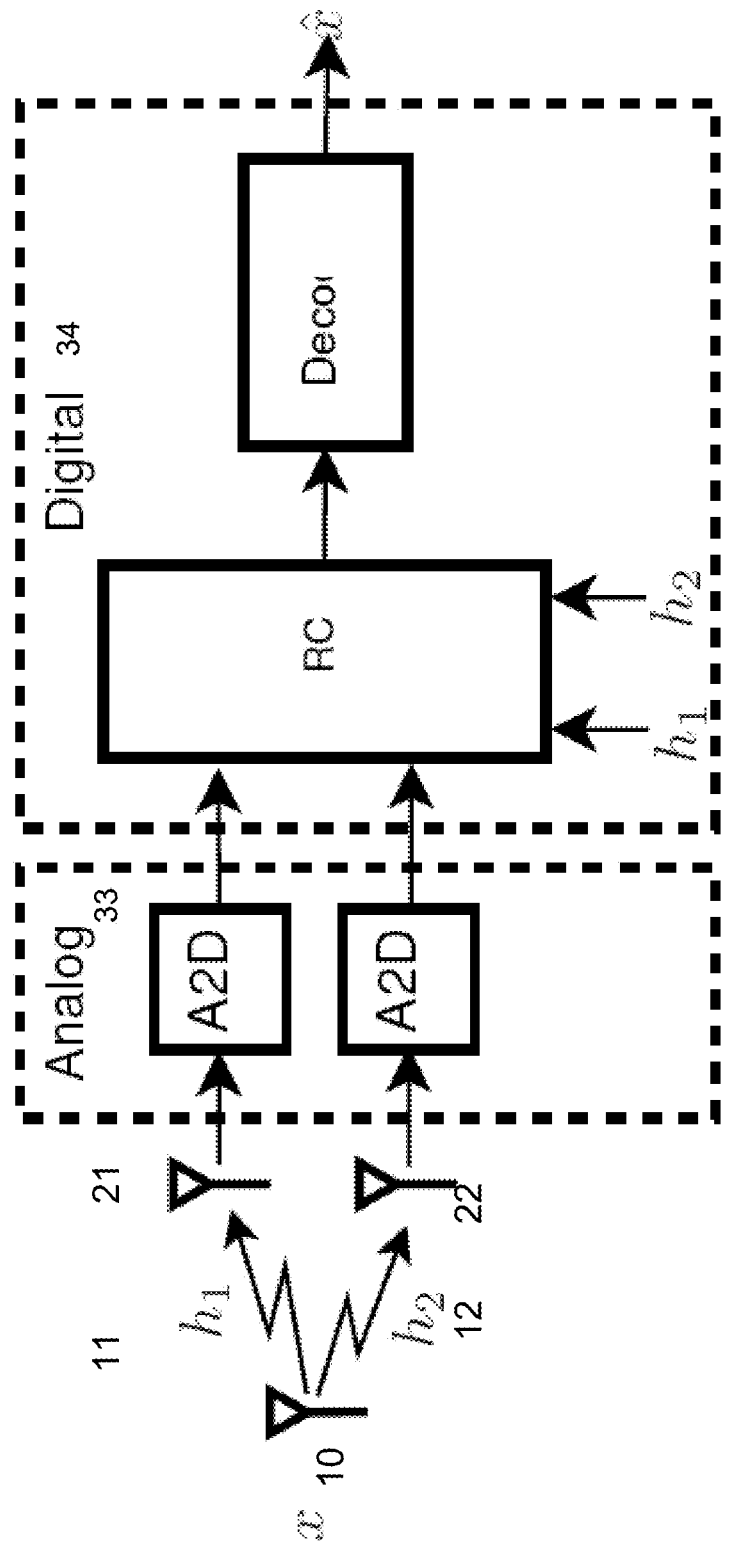
FIG. 3 is an example of a receiver.

The best performance may be attained by quantizing the output of each antenna and then using maximal-ratio combining (MRC) as depicted in FIG. 3. This produces an effective scalar channel as illustrated in equation (16).

As the variation of ||(h1 h2)|| is much smaller than that of either h1 or h2, diversity is attained. This may intuitively be understood by noticing that both h1 and h2 have to vanish in order for h to vanish. When h1 and h2 are independent, we obtain a diversity order of 2. The precise performance of MRC under independent Rayleigh fading is well-known and may be found.

Figure 4:
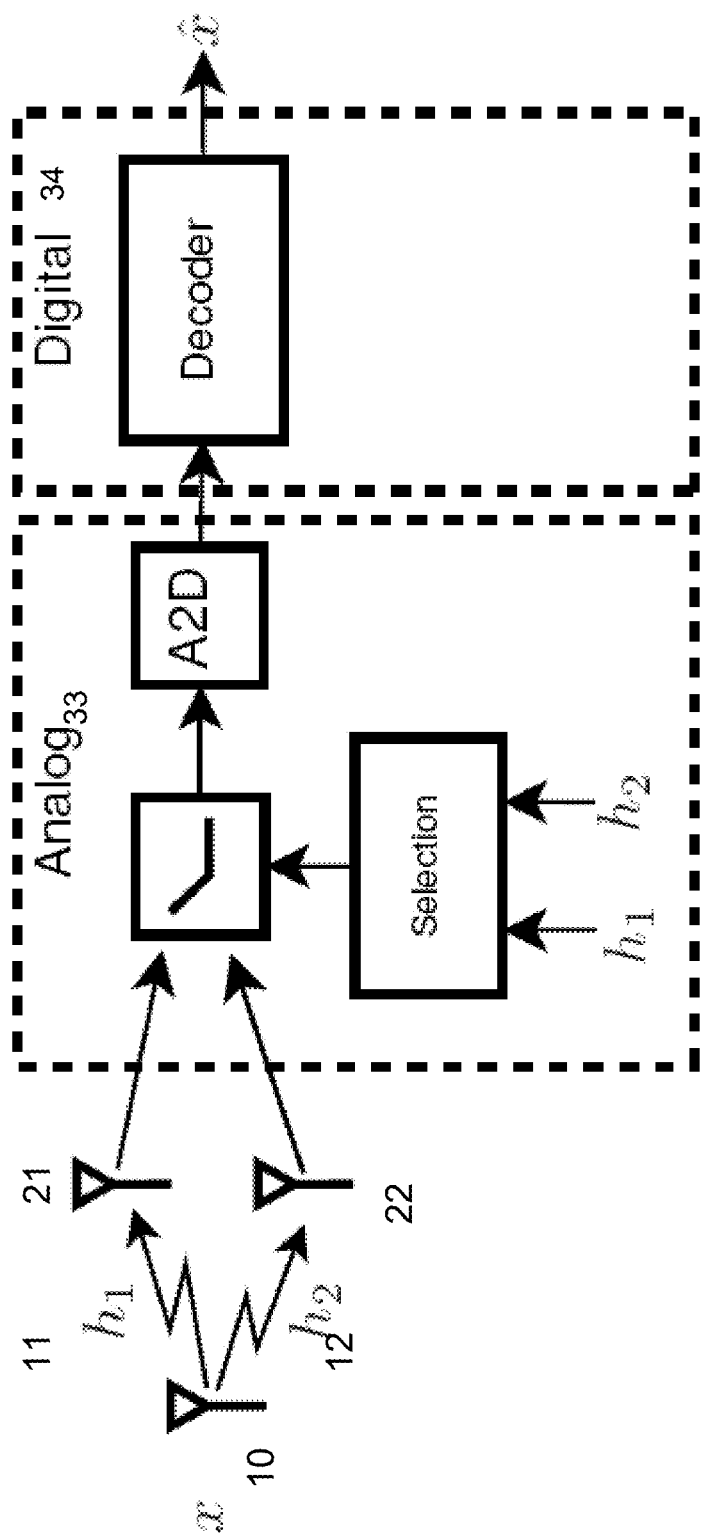
FIG. 4 is an example of a receiver.

The major downside of such a system is that two RF chains and A/Ds are needed. A classic alternative to MRC that requires only one RF chain is the method of antenna selection or "selection combining" (using switch between antennas 31 and 32 and A2D) as depicted in FIG. 4.

Here, rather than choosing the antenna arbitrarily, we choose the one with the higher SNR. Thus the effective channel becomes equation (17)

While the performance does not reach that of MRC, it does attain a diversity order of 2. Again, the precise performance under independent Rayleigh fading of selection combining is well-known. One downside of selection combining method is that it requires analog detection and switching mechanisms.

Figure 5:
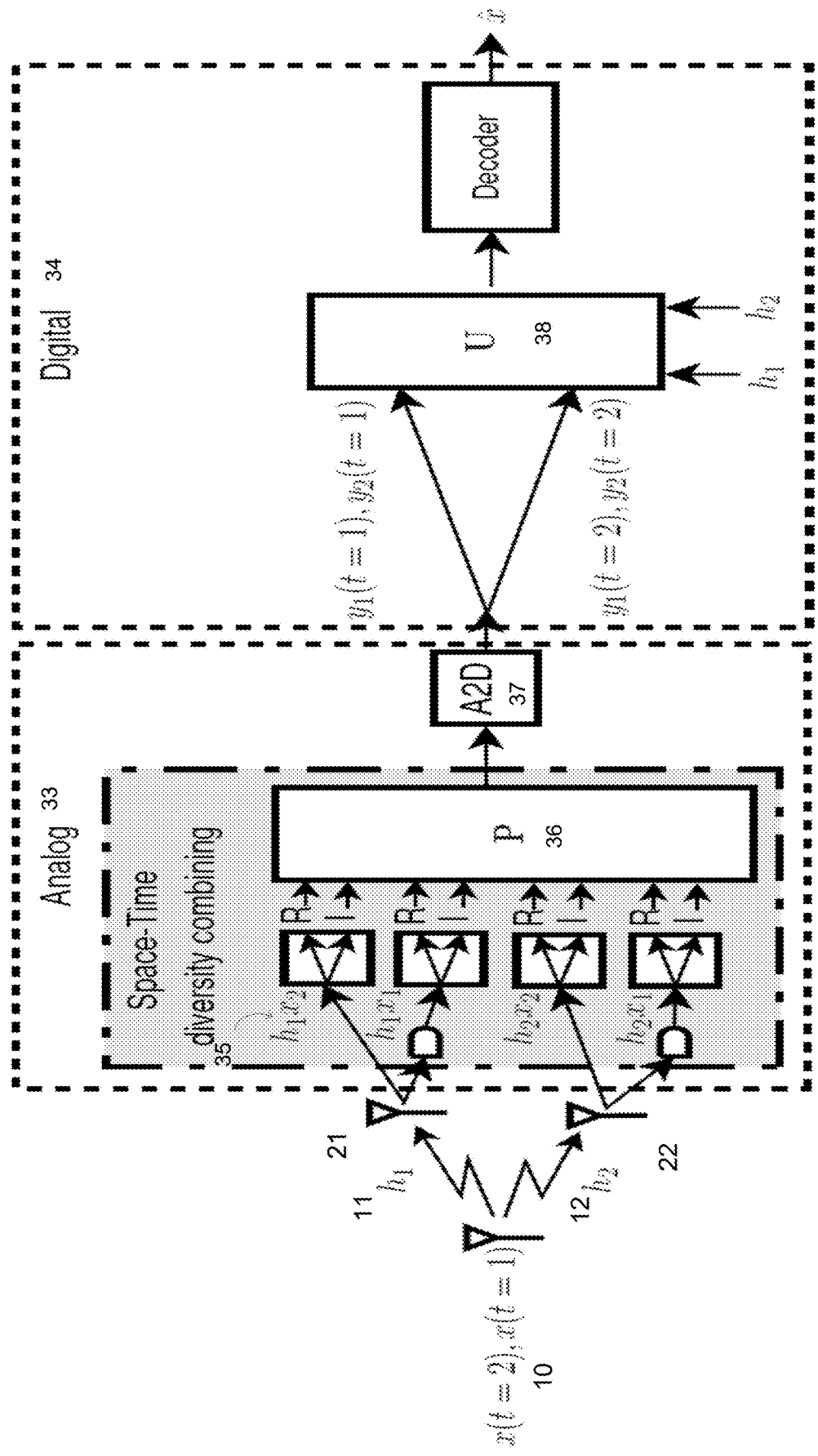
FIG. 5 is an example of a receiver.

FIG. 5 is an example of a receiver 30 that performs space time diversity combining. Two antennas 21 and 21 receives signal x after passing through channels h1 11 and h2 12. A preprocessing 35 includes delaying (to provide h1×1 and h2×1) and splitting between real and imaginary signals (I,R) to apply dimension reduction matrix P 36—in the analog domain 33—before A2D 37 and sending to digital part 34 in which channel based matrix U 38 is applied before digitally decoding.

Now the effective channel takes the form illustrated in equation (18).

It follows that the scheme also attains a diversity order of 2 but loses precisely a factor of two in terms of SNR with respect to MRC. In comparison with selection combining (without taking into account implementation losses), there a loss in the achieved SNR while an advantage is that no estimation of channel quality in the analog front end nor switching is required.

A comparison of the performance of the proposed method is shown in FIG. 6 which plots the bit error rate of all three methods for uncoded QPSK transmission.

Multi-User Scenario

We consider now the scenario of a 2×N MIMO-MAC system where N users, each equipped with a single antenna, transmit to a common receiver that is equipped with two antennas. Again, it is assumed that only a single RF chain is to be used at the receiver. As a figure of merit for performance, we now use the symmetric capacity (recalled below). We note that unlike in the case of a single user, sophisticated multi-user detection methods need to be applied in order to approach the symmetric capacity.

We first recall the more general channel model of a MIMO-MAC with N users, where each transmitter has $N_t$ antennas and the receiver has $N_r$ antennas. The input/output relation can be expressed as where $H_i$ is the channel matrix between user i and the receiver. We assume isotropic ("white") transmission by each user and that all users are subject to the same power constraint P.

Define a subset of users by $S \subseteq \{1, 2, \ldots, N\}$. Then, the capacity region of the channel is given all rate vectors $(R_1, \ldots, R_N)$ satisfying for all subsets S in the power set of $\{1, 2, \ldots, N\}$.

If we impose the constraint that all users transmit at the same rate, then the maximal achievable rate is given by substituting $R_i = C_{sym}/N$ in (19), from which it follows that the symmetric capacity is dictated by the bottleneck: As all the combining methods considered involve only linear operations, we may obtain the associated symmetric capacity for each by computing (20) for the respective effective channel. We next derive explicitly the symmetric capacity associated with each method for the case of two users.

We first consider the unrestricted symmetric capacity, i.e., the symmetric capacity for a system employing optimal reception (two RF chains).

We note that we may rewrite (18) to provide equation (21). When Hi is expressed by equation (22).

Denoting Hcomb=[h1 h2], (20) can be written as equation (23)

Similarly, for SC, the symmetric capacity can be expressed as equation (24).

We now turn to the case of the proposed method. By (5) and (18), the output is given by equation (25) where $U(h_{1i}, h_{2i})$ is given by &. Recalling that these matrices are orthonormal, we obtain equation (26).

FIG. 6 (left) depicts the CDF of all three methods for N=8 users, each with power constraint P=1. As can be seen, Alamouti combining clearly outperforms SC.

FIG. 6 (right) also depicts the outage probability as a function of the SNR, where all users transmit at a common target rate of 2 bits per complex channel use. While the universal combining scheme maintains the ~3 dB gap from the MRC, SC suffers from a larger gap. In fact, it is easy to see that the (asymptotic in SNR) gap of SC becomes arbitrarily large as the number of users grows Application to Multi-User Detection in the Cloud The real strength of the proposed method appears in distributed scenarios as we now exemplify in the context of 5G multi-user detection in the cloud. Unlike in the previous section, the scheme we present now operates purely in the digital domain. We assume that each antenna is sampled separately and the benefit is not in the realm of hardware simplification but rather in making efficient use of the limited bit rate available in the fronthaul link in a C-RAN setting.

A further difference is that we no longer assume frequency flat fading. Rather, we will assume that a font-end operation after A/D conversion is to apply a DFT operation, thus working in the frequency domain. In other words, the static channel we will consider is to be understood to apply to a single tone. The "time" index t will correspondingly refer to subsequent uses of the same tone, or in a practical setting could apply to adjacent tones as these typically have very similar channel coefficients.

Figure 7:
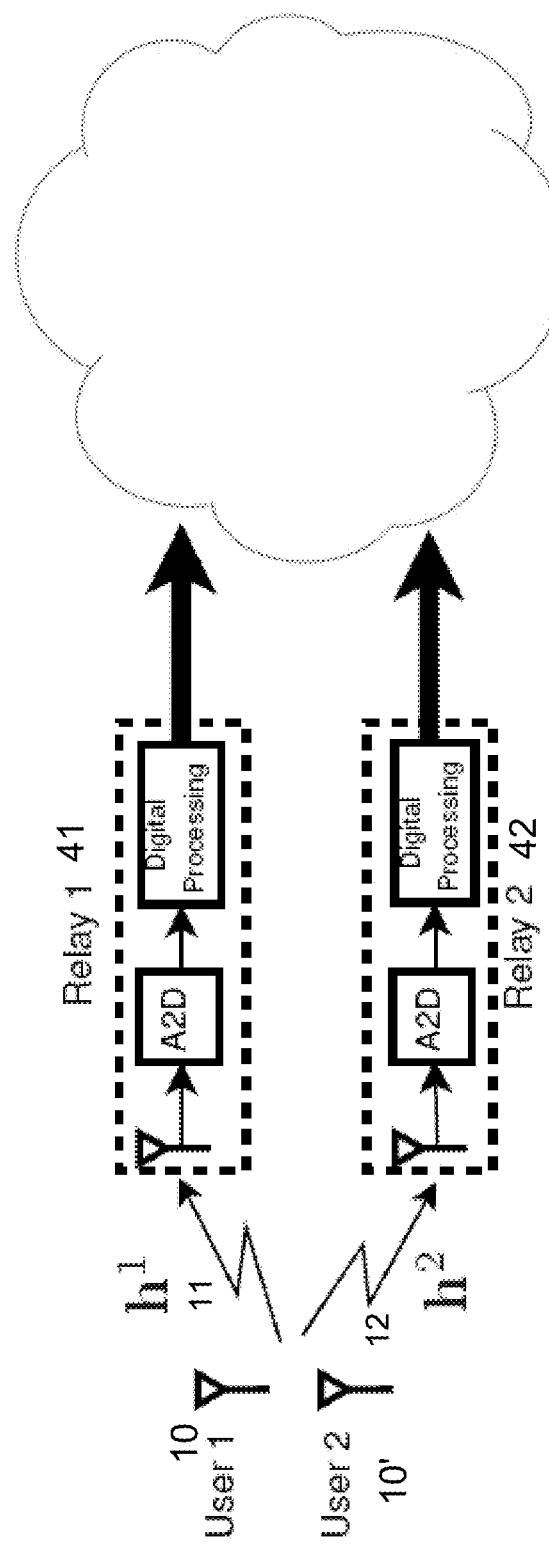
FIG. 7 is an example of a receiver.

As a baseline system, consider the system depicted in FIG. 7 in which two users wish to communicate with a base station via two relays (relay1 41 and relay2 42), where both users as well as the relays are equipped with a single antenna. The relays are connected to the base station via rate-constrained bit pipes.

The latter scenario has been extensively studied. In this section we show how the space-time diversity method developed in the present work can serve as a simple and practical means to reap a substantial part of the gains promised by the vast body of theory already established.

The received signal at relay i=1, 2 is given by equation (19), where $h_{ij}^k$ denotes the channel gain between user k and antenna j in relay i. Since currently we are considering single antenna relays, j=1.

We employ the most basic compress-and-forward protocol where correlation between the received signals is ignored and each relay simply quantizes the received signal and sends the quantized output via its bit pipe. To simplify the exposition and since the quantization noise will again behave in much the same manner in all schemes to be considered, we do not account for it in the system description in the sense that we assume that it is negligible with respect to the Gaussian noise (although it plays an important role in determining the rate needed to be supported by the bit pipes).

The base station thus receives at each time instance (the time index plays no role at this point) the vector y=(s1(t), s2(t))$^T$.

We assume that it also knows (is able to estimate) the channel coefficients and thus can form the combined effective matrix of equation (20), where the upper part of the matrix corresponds to the signal originating from relay 1 and the bottom corresponds to relay 2.

It next applies a linear equalizer to obtain a soft estimation of the source vector. For instance, it may use a zero forcing equalizer, as illustrated in equation (21), or a linear minimum mean square error (MMSE) equalizer.

Assuming uncoded transmission for simplicity, the latter vector is then fed into a slicer.

Figure 8:
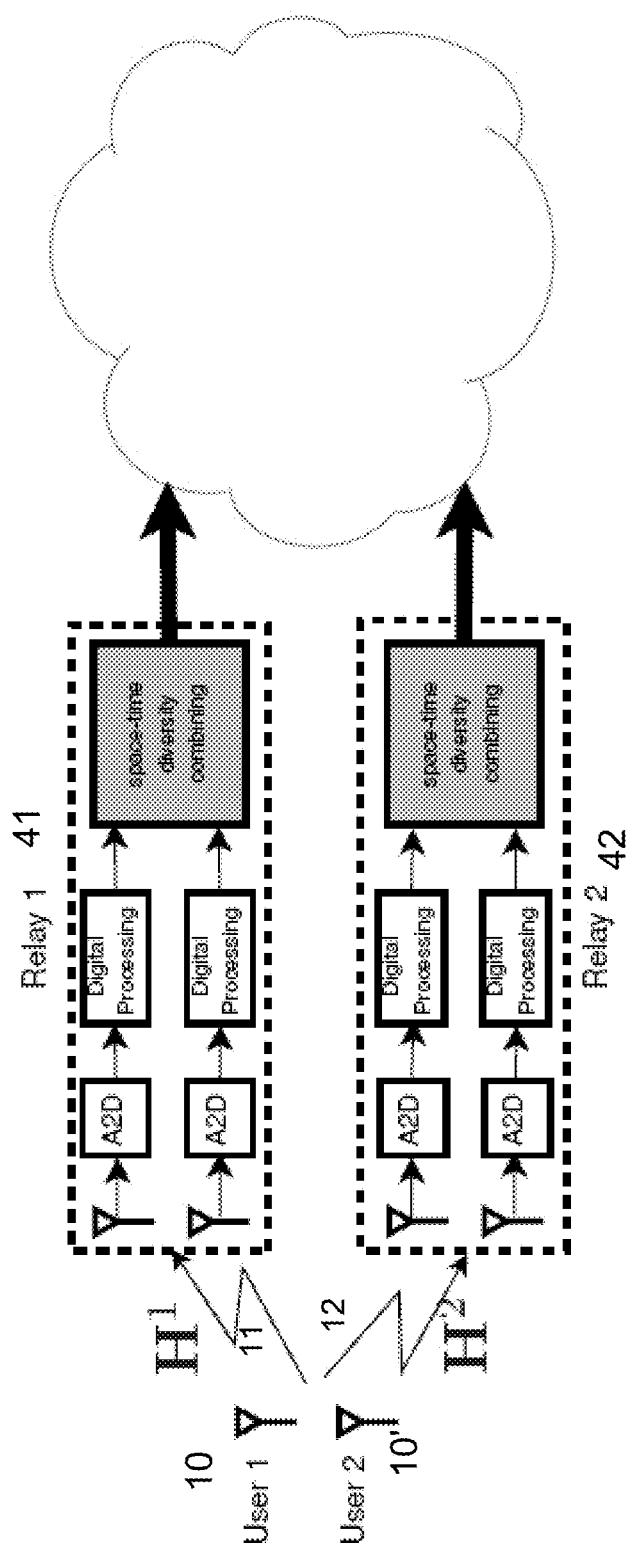
FIG. 8 is an example of a receiver.

Now consider the same scenario except that each relay (relay1 41 and relay2 42) is now equipped with two antennas, rather than one, as depicted in FIG. 8. Thus, received signal at relay i=1, 2 and antenna j=1, 2 is given by equation (22).

Thus, the channel matrix of relay i is given by equation (23).

The question now arises as to how best to utilize the finite number of bits available per sample in quantizing the output of the two antennas. Due to the distributed nature of the problem, both MRC and selection combining are inapplicable as the base station is interested in recovering both signals. In other words, consider antenna selection and suppose that one user experiences a higher SNR at antenna 1 and the situation is reversed for the other user; which antenna should one select?

We now demonstrate that while keeping the bit rate fixed, each relay can nonetheless provide diversity gains to both users using the novel combining method, precisely since it makes no use of channel state information at the quantization stage, rather only in the reconstruction stage.

Assuming both relays use the scheme, the signal passed to the cloud from relay i is given by equation (24), where xj represents the real representation of the signal transmitted by user j over the two time instances according to the notation in (3). Thus, at the cloud we obtain the combined relation illustrated in equation (25).

Note that the effective matrix G has the desirable property that each of the four submatrices is orthogonal. Thus, it is expected that applying zero-forcing to the effective channel followed by a slicer (or in general, a decoder) will perform better than the baseline scheme.

Figure 9:
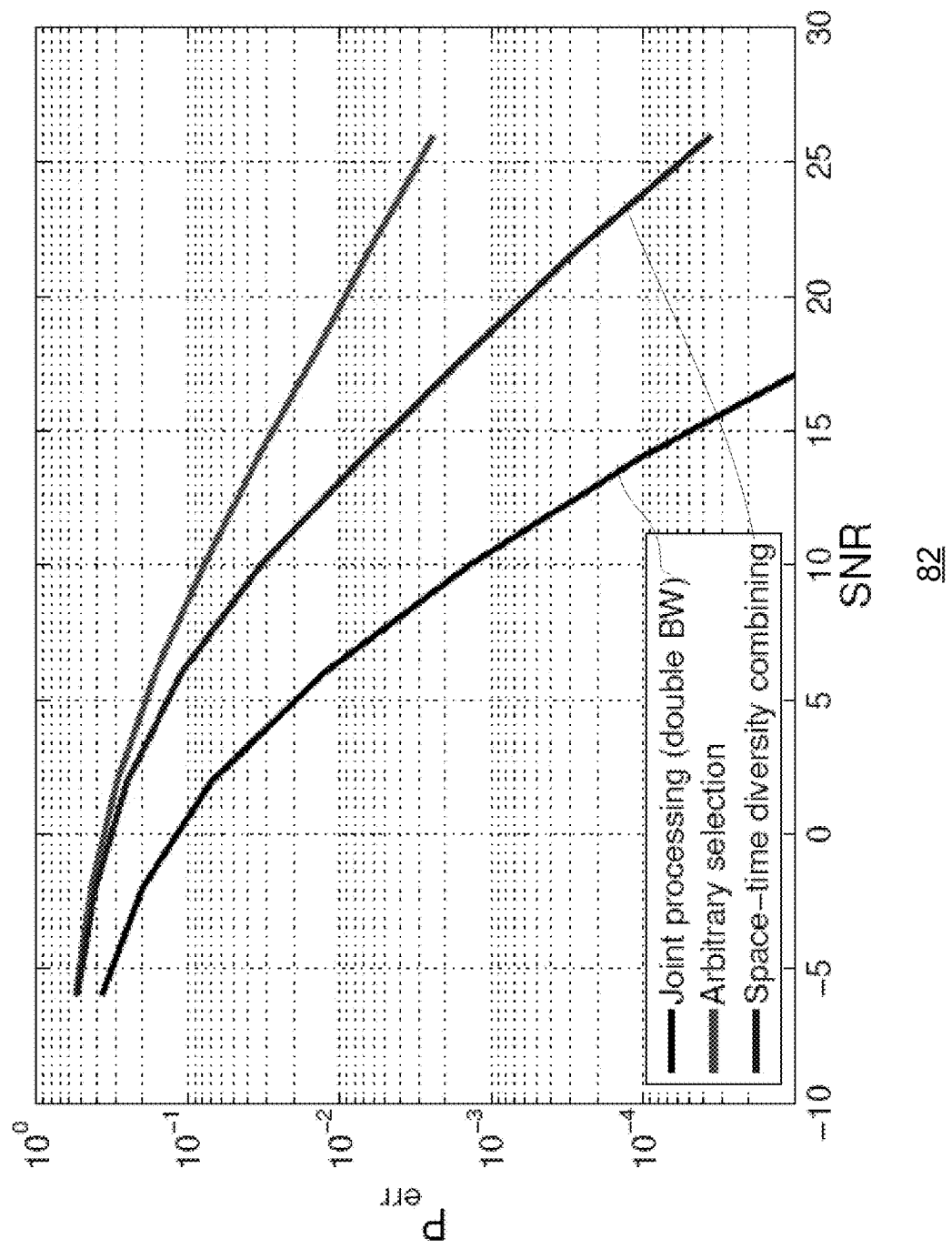
FIG. 9 is an example of bit error rates of various receivers.
Figure 10:
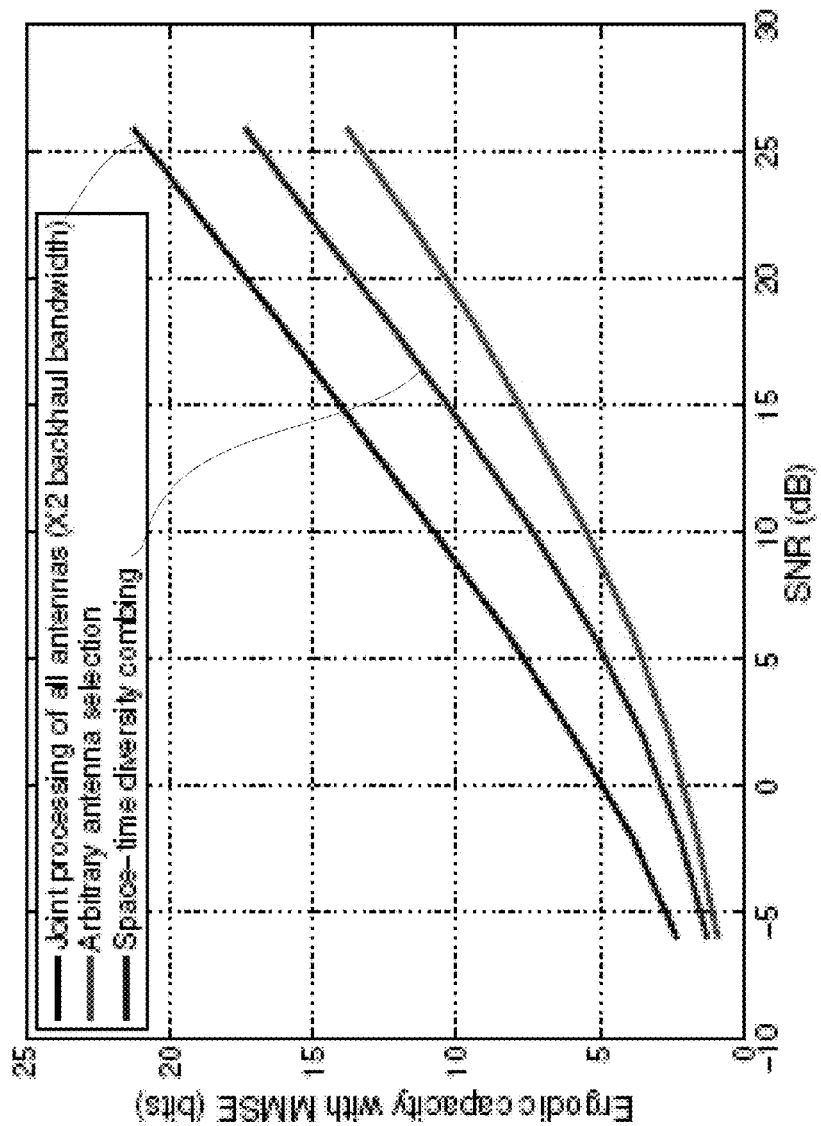
FIG. 10 is an example of ergodic capacities of various receivers.

The performance of the proposed scheme is demonstrated in FIG. 9 (graph 82) and FIG. 10 (graph 83). FIG. 9 shows the bit error rate achieved by the scheme for uncoded QPSK transmission as well as the baseline scheme, which may be thought of as choosing one antenna at arbitrary. As another benchmark, we also plot the performance obtained for the same receiver structure (linear MMSE equalization followed by a slicer) where the central receiver obtains the output of all four antennas (two from each relay).

FIG. 10 compares the three schemes with the same (linear MMSE) equalization but coupled with ideal coding over many i.i.d. realization of the channel. Specifically, we depicts the ergodic capacity associated with each combining method.

Extensions to More than Two Antennas

As in the case of space-time modulation, extension to more receive antennas is possible, albeit with some loss. A natural approach is to try utilizing the theory of orthogonal designs. It should be noted however that it is well known that the decoding delays (number of time instances stacked together) roughly grows exponentially with the number of antennas. Another possible avenue is to try to follow the approach of quasi-orthogonal space-time codes.

Attempting to apply orthogonal designs, one immediately confronts a basic obstacle due to the fact that rate 1 complex orthogonal designs do not exist beyond the case of two antennas. We next demonstrate the problem that arises and also show how it may be resolved by judiciously combining balanced rate 1/2 orthogonal designs (which includes the four basic OSTBCs for 2-8 antennas) with repeated quantization used in conjunction with multiplicative dithering. For the sake of concreteness and ease of exposition, we demonstrate the method for the case of four receive antennas.

Equations (1)-(33) are included in FIGS. 14-20.

The received signals are given by (1) where now i=1, . . . , M (with M=4). We proceed by stacking T=8 time instances of the received signal from the 4 antennas and build an effective real-valued vector by decomposing each entry into its real and imaginary components, just as is done in (2). This yields for M=4, a vector s of dimension 2×4×8=64.

By reinterpreting the rate 1/2 orthogonal design of 4 transmit antennas, we arrive at a 8×64 transformation matrix P as displayed in (26).

Next, we form a 8×1 real vector u by applying to the effective received vector s, formed in the manner described in (2), the transformation u=Ps/square_root(8).

It can be shown that equation (27) holds, where U(h1, h2, h3, h4) is displayed in equation (28).

Here, the vector x is the 16-dimensional real representation of the transmitted signal over T=8 time instances, formed analogously to (3).

We note that rows of U(h1, h2, h3, h4) are orthogonal for any values of h1, . . . , h4. From this, it also follows that n' is white (and Gaussian with unit variance). The problem with using a non-rate 1 orthogonal design now becomes clear. Unlike U(h1, h2) (see (6)) which is square, U(h1, h2, h3, h4) on the other hand is non-square and hence is noninvertible.

We overcome this obstacle by passing the same observation vector s via a "dithered" version of P, such that another set of 8 mutually orthogonal measurement rows is attained.

Specifically, let us define a 4 dimensional vector d=(d1, d2, d3, d4) where di are complex numbers of unit magnitude (pure phases). We form a dithered version of the antenna outputs as equation (29) where di does not depend on t. We assume that the di are drawn at random as i.i.d. uniform phases.

We may associate with ~si(t), t=1, . . . , T=8, the effective 64-dimensional real vector ~s. Next, we obtain another 8-dimensional real vector ~u by applying to the vector ~s the transformation of equation (30).

We therefore obtain equation (31), where n" is distributed as n' (and of course is a function of it).

Note that the dithers drawn implicitly (via (29) and (30)) define a "dithered" combining matrix ~P. Combining (27) and (31), we have equation (32).

Finally, we apply component-wise quantization to obtain equation (33): y=Q(yeff)_diff.

We may then recover an estimate of x by applying the inverse of F to y or a linear MMSE estimator.

Time-Domain Sub-Nyquist Interpretation/Application

In this section we build on the well-known analogy between combining techniques for multiple-antenna arrays and those applied for time-domain signals. For example, the relation between maximal-ratio combining for antenna arrays and the sampled matched filter as an optimal front end (i.e., producing sufficient statistics) for a pulse-amplitude modulated time-domain signal is well recognized.

We describe how the developed diversity-combining technique may be leveraged to arrive at a sub-Nyquist signal acquisition method that is applicable to pulse-amplitude modulated signals.

Specifically, suppose we observe a (discrete-time) signal that is known to be of the from s(t)=hx(t)+n(t), t=1, . . . , K, where n(t) is i.i.d. circularly-symmetric complex Gaussian noise of unit power and all vectors are column vectors of some dimension N. In other words, we know that the signal is sparse and lies in the K-dimensional subspace of C spanned by the vectors of the form [0, . . . , 0, h, 0, . . . , 0], as is the case in (the discrete-time representation of) pulse-amplitude modulation (PAM).

We may view has a pulse shape of length N. The pulse shape used may change after NK time instants.

For example, for the case of K=3, the basis assumes the form of a 3×3 matrix, in which the first row is h,0,0, the second row is 0,h,0 and the third row is 0,0,h).

Figure 11:
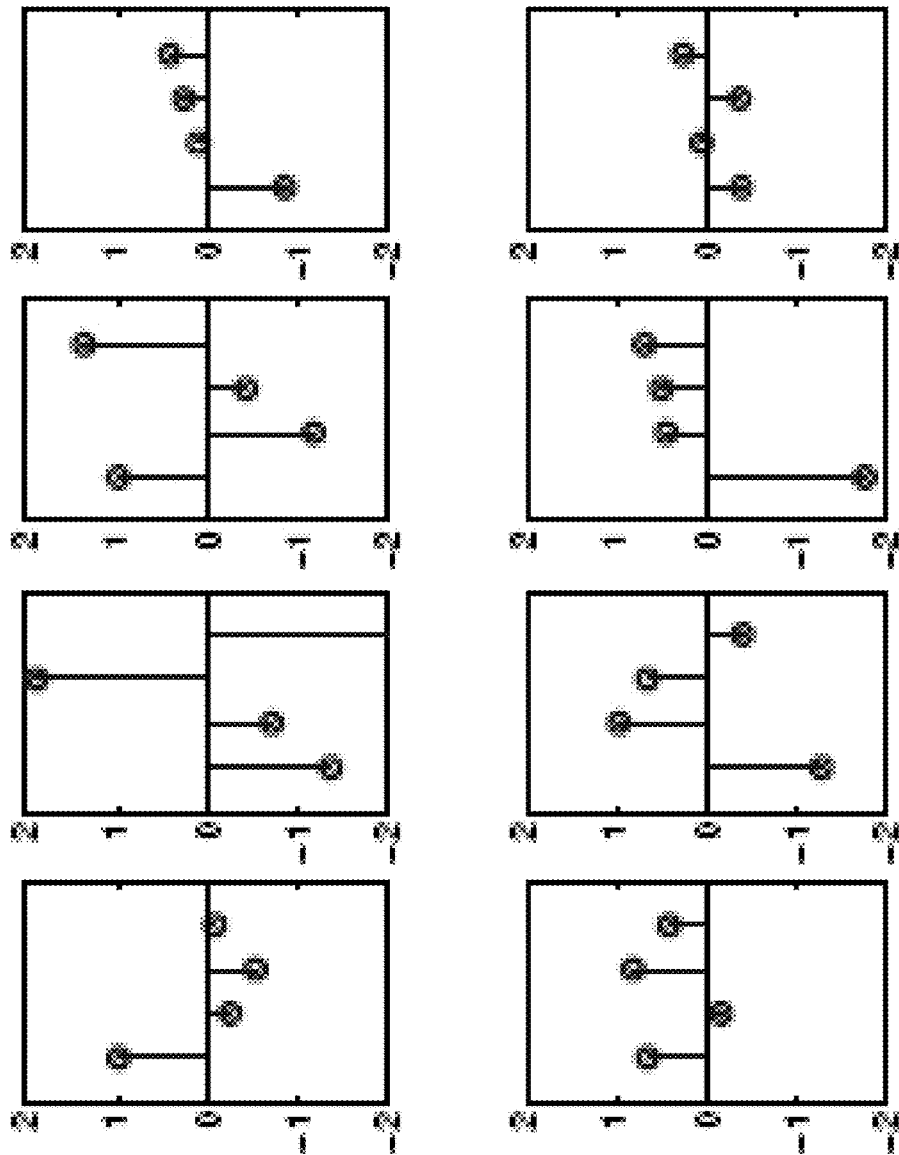
FIGS. 11-13 illustrate an example of an analog to digital conversion.

An example for a scenario where the assumed model may be applicable to is sub-Nyquist detection of a frequency hopping signal. In a frequency hopping system, which is an effective method to combat jamming, the signal carrier is being chosen (based on a pseudo-random sequence) from a signal dictionary and is being changed at predefined symbol As a concrete example, we may envision that h is a (complex) four-tap carrier signal in a PAM transmission system that is chosen pseudo randomly from a "dictionary". FIG. 11 depicts the real part (71) of such a possible dictionary consisting (in this example) of eight possible pulse shapes. The pulse shape chosen is kept constant for several symbols.

For simplicity of exposition, we assume that the receiver is synchronized in the sense that it knows when each pulse shape starts and ends and also knows which member of the dictionary is being used. Nonetheless, the proposed scheme may be advantageous in scenarios where h is unknown at the time of signal acquisition (sampling) and is revealed to the receiver end (or is estimated by it) subsequently.

Figure 12:
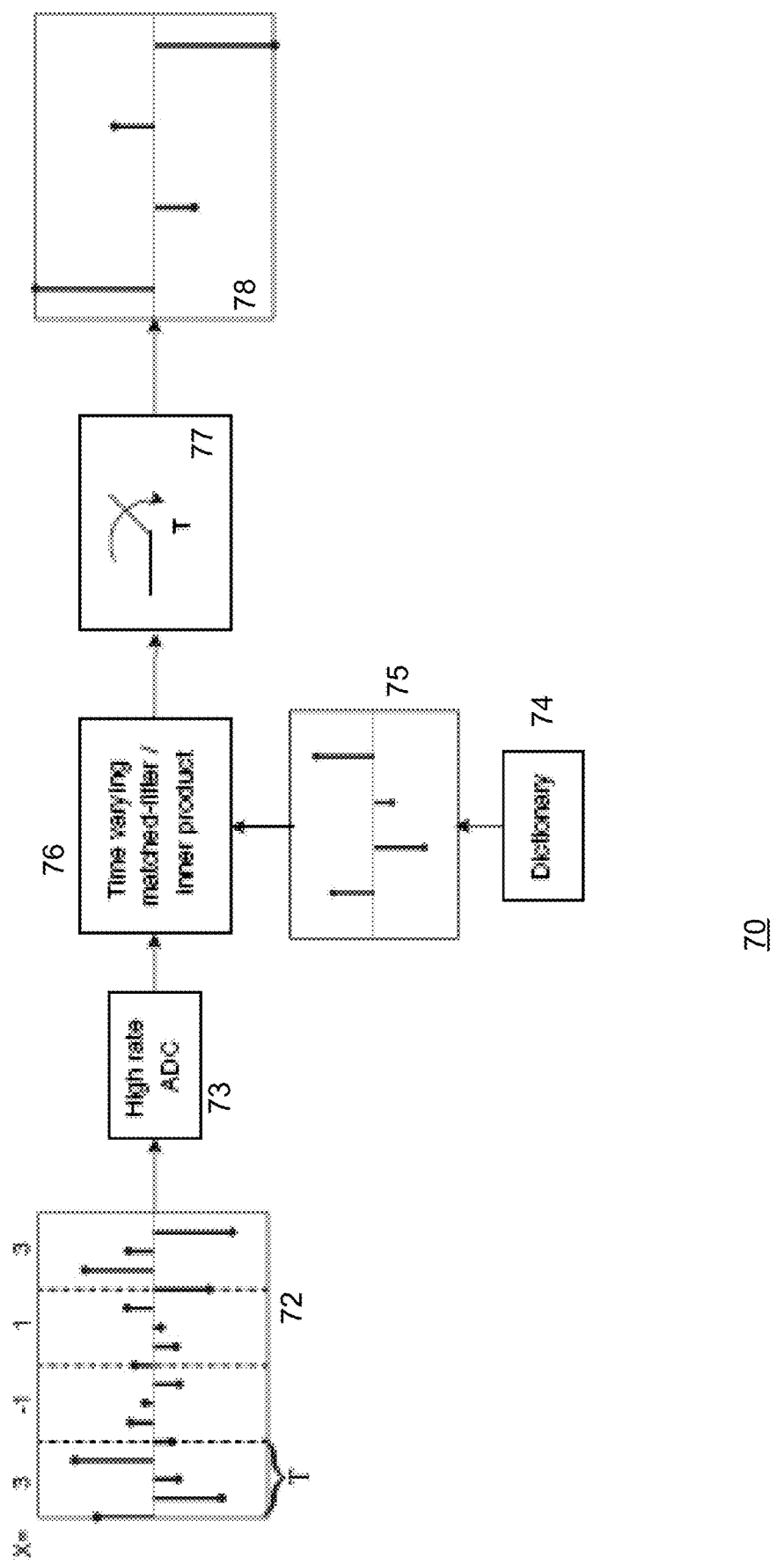
Figure 13:
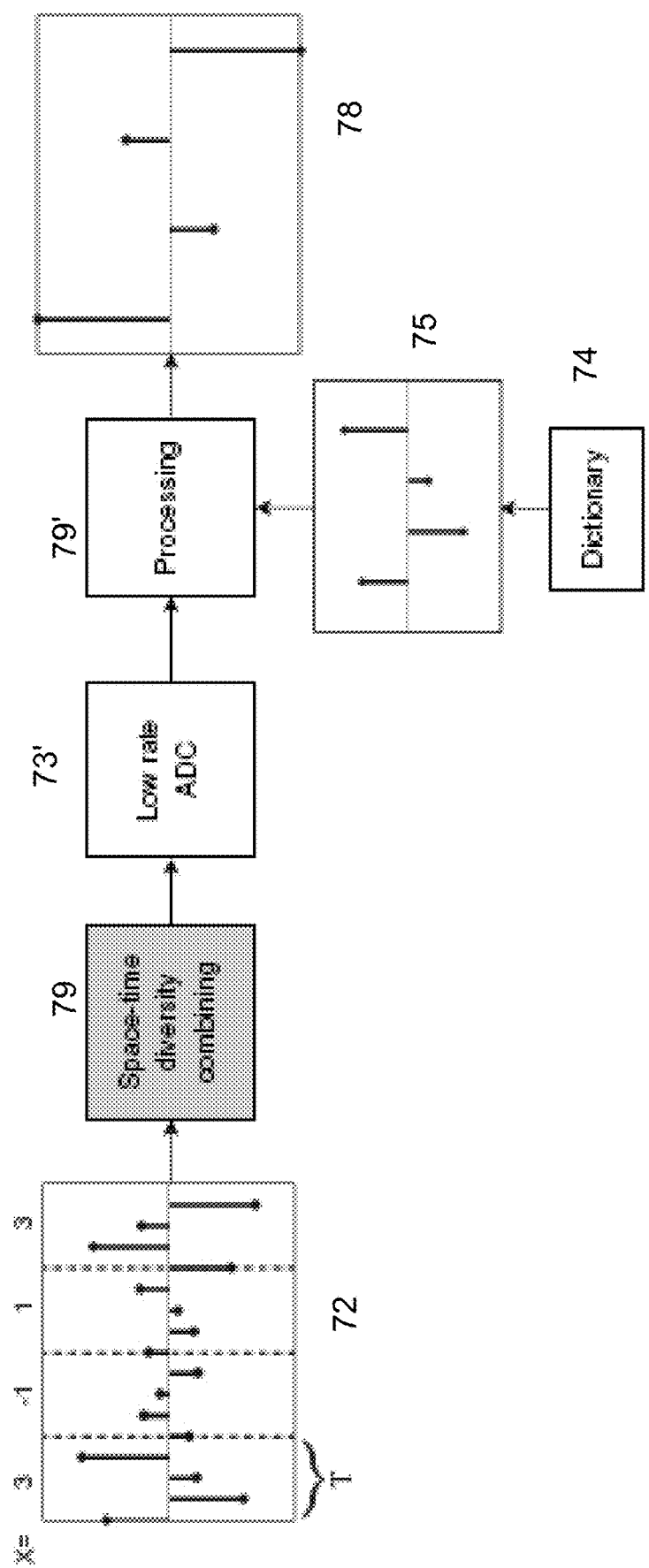
Figure 18:

FIG. 12 depicts the optimal method for detection of the transmitted data. The signal 72 is Sampled at full rate (high rate ADC 73). Specifically, assuming the pulse shape occupies T seconds in continuous time, sampling at full rate means sampling at a rate of Hz (in the Example, N=4).

Then, a matched filter (time varying matched filter inner product 76) is applied and its output is sampled (at a rate of 1/T Hz—sampler 77) for data recovery 78. Dictionary 74 sets 75 the matched filter.

We note that it is possible to implement the matched filter in the analog domain and sample at a rate of 1/T Hz. However, this requires implementing an analog filter bank, whose size should match that of the pulse shape dictionary and hence it is feasible only for small dictionaries.

The application of the proposed universal diversity method is demonstrated in FIG. 12. In line with the duality mentioned above, the example considered where the pulse shape consists of four taps corresponds to a SIMO system with four receive antennas.

As was described in Section V, universal linear diversity combining (79) is performed by applying an 8×32 precoding matrix $G_{quasi}$ (assuming quasi-orthogonal precoding is used). The precoding matrix is applied to the stacked data of the real-valued representation of four consecutive PAM modulated complex symbols. We note that this requires implementing delay as well as summation and negation elements in the analog domain. After sampling, the data is recovered (79'), e.g., by applying linear MMSE equalization with respect to $F_{quasi}$ followed by decoding. The linear diversity combining (79) is followed by low rate ADC 73' that is followed by preprocessing 79' fed by sample 75 from dictionary 74.

We further note that one could also use tap selection (in analogy to antenna selection) to reduce the sampling rate, i.e., sample at the time corresponding to the strongest tap of the pulse shape to achieve even better performance than that of universal diversity combining. Nonetheless, whereas in the latter, the analog front end does not vary in time, optimal selection translates to applying a shift in the sampling time, every time the pulse shape changes.

Finally, we note that whereas when one considers an antenna array in a wireless fading environment, it is usually hard to expect that the channel coefficients remain constant over many symbols, thus precluding the use of space-time block codes when the number of antennas is large (as the needed coherence time grows exponentially with the number of antennas). In contrast, when considering the application to a time-domain signal, it is very reasonable to assume that the pulse shape remains constant over a long period of time and as a consequence, one can apply the proposed scheme to pulse shapes consisting of many taps (at the expense of considerable processing complexity in the digital domain).

A Simple Receive Diversity Technique for Distributed Beamforming

Cooperative diversity is a means to boost the reliability of communication over a wireless fading medium where adjacent devices collaborate and share their antennas towards to facilitate communication between a source and destination node. Different approaches and transmission protocols have been investigated over the years with this goal. Aside from the reliability attained, the approaches differ greatly in the degree of coordination they require. Beyond the obvious benefit of reducing the amount of coordination in terms of overhead and requirements on channel coherence length, the degree of required coordination is of prime importance in systems that have stringent latency requirements where it is essential to avoid multiple rounds of communication prior to sending the data payload.

The potential of using multiple single-antenna relay nodes as a means of forming a virtual antenna array has been recognized and studied in depth. Depending on the assumptions made on the availability of channel state information (CSI) at the relays, the virtual antenna array can serve either to provide diversity alone or to obtain also array (power) gain; the former not strictly requiring (forward, channel from relay to destination) CSI at the relays whereas the latter requiring at least local CSI to be available at the relays.

When the goal is to attain diversity alone, one can employ distributed space-time coding, by means of opportunistic relay selection, or by using standard codes in a cooperative/distributed scenario.

Recently, as interest in Internet-of-Things (IoT) scenarios has grown, the need for communication protocols that can provide ultra reliability while maintaining low latency has become apparent. While it is obvious that increasing the number of antennas enables to attain higher diversity and a power gain, utilizing these while meeting stringent latency constraints introduces some challenges.

In the case of a system where all nodes are equipped with a single antennas and each relay knows the channel gain between itself and the destination, distributed (phase-only) beamforming can be performed with only little loss being incurred from the availability of only local CSI as compared to true (centralized) beamforming (full array gain). In fact the loss is equivalent to that incurred in the dual (receiver side) scenario of performing equal-gain combining rather than maximal-ratio combining (MRC), which is a classic problem that has been explored in depth. In fact it has been shown that given a per-relay power constraint, such phase-only beamforming is optimal (in the sense of maximizing the receive SNR).

The latter insight can be extended to the case where the destination node is equipped with two receive antennas. That is, we show that given local CSI at the relays, one can attain outage probabilities that are comparable to those attained when the relays perform centralized beamforming on the maximum singular vector of the joint channel, up to a moderate power loss.

The key element used in the proposed scheme is the universal space-time diversity combining transformation that is performed as a front-end operation at the destination node.

The transformation is universal in the sense that it is channel independent and so the receiver is not required to acquire any CSI. Similarly, we do not require the transmitter node to have access to any CSI. Rather, we assume that perfect yet local only CSI is available at each relay.

Such CSI assumptions fit well a scenarios where there is a large number of "potential" relays, but only a rather small subset will be active in a given communication round. In such a scenario, it is inefficient for the source and destination nodes to try to acquire CSI due to the large pool of potential relays, and then further feed the CSI back to the relays. A reasonable approach is to have the relays acquires local CSI (on both source-to-relay and relay-to-destination links) via channel reciprocity and employing time-division duplex (TDD).

We also note that similar considerations lead to TDD being advocated for use in massive (non-distributed) MIMO systems.

System Model and Review of Known Results

Figure 21:
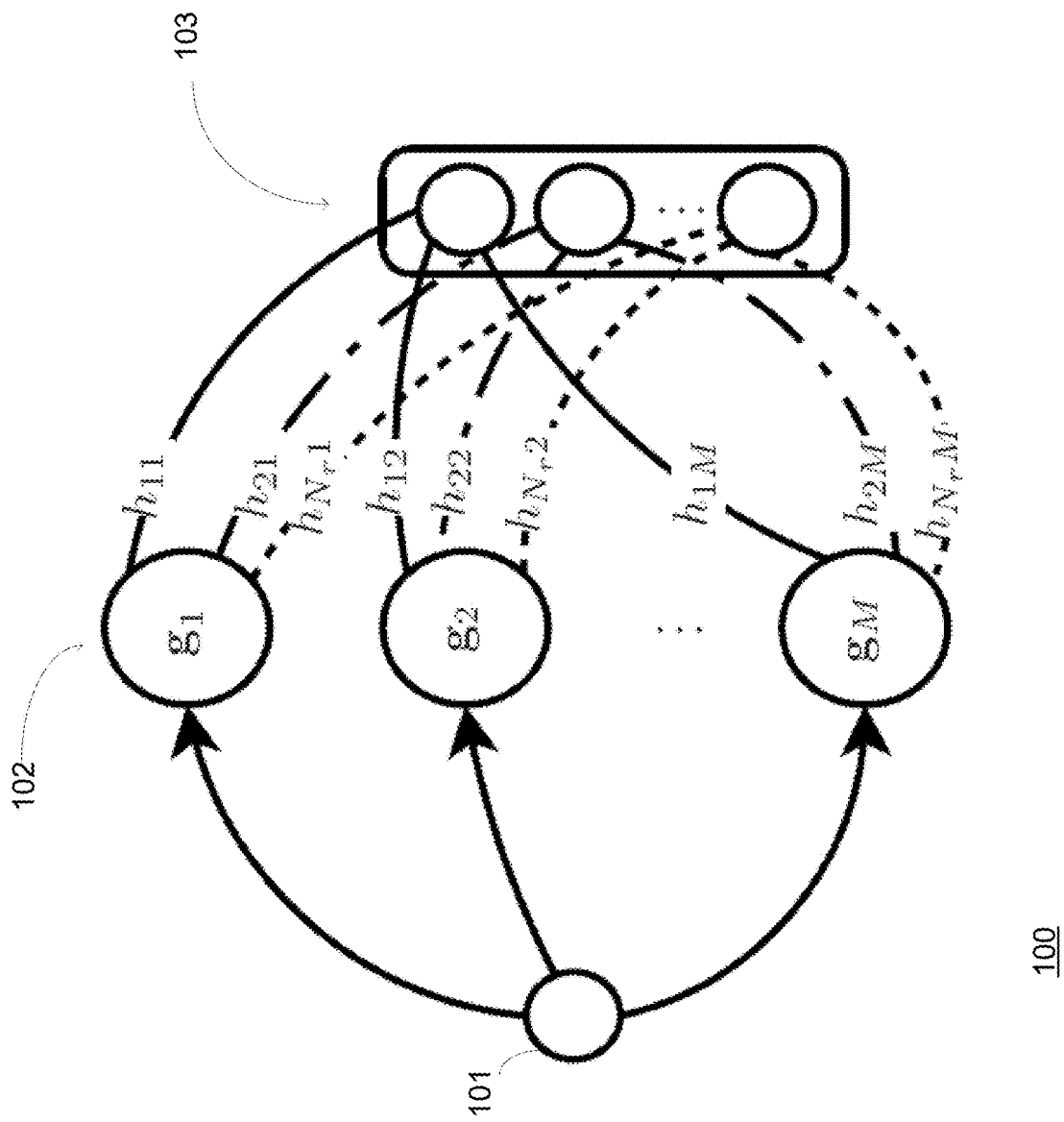
FIG. 21 is an example of a system.

We assume a transmission between a source node 101 and a destination node 103 via an array of M relays 102 where the source and each of the relays are equipped with a single antenna whereas the receiver is equipped with $N_r$ antennas as depicted in FIG. 21.

Perfect synchronization of all nodes is assumed and we strive to achieve array gain in addition to diversity gain.

The number of transmit antennas per node is not limited to one and in particular the destination node is equipped with two antennas or more.

For simplicity, we will describe the scheme assuming the destination node has exactly two antennas and source and relay nodes are equipped with one antenna. We note that all the schemes described later can seamlessly be combined with relay transmit antenna selection so as to enjoy further diversity gains (on the forward link) in the case of multiple-antenna relays. As for the link from the source node to relays, simple MRC combining can be used in such a case.

We consider a two-phase protocol. In the first phase, the source node transmits the coded message and all relays are in listening mode.

As for the second phase, the proposed scheme can equally fit a decode-and-forward (DaF) or an amplify-and-forward (AaF) mode of operation. For simplicity, we will describe a DaF protocol where all nodes that have successfully decoded the message participate in performing distributed beamforming as described next. We denote the (random) number of relays that successfully decode the message by M'. We note that we are considering what is referred to as "reactive multiple-relay DaF".

We assume that the channel coefficients do not change over the entire transmission period of 2T symbols, where each phase occupies T symbols. All nodes are assumed to operate in half-duplex mode and for simplicity we assume there is no direct link between the source and destination.

As for CSI, we assume that before transmission begins, both source node and destination node, send a beacon (clear-to-send, ready-to-receive) signal, from which the relays can obtain perfect local CSI by invoking channel reciprocity. Thus, we assume that transmission during both phases is over the same frequency band.

The source node encodes the data to form the transmitted signal x(t), t=1, 2, . . . , T, where T is the blocklength. The transmitted signal must satisfy the power constraint $E\{|x(t)|\} \leq P_s$.

Equations (1)'-(37)' are included in FIGS. 29-38.

The received signal at relay i is illustrated in equation (1)' where $n_i(t)$ is circularly-symmetric complex normal CN (0,1) and is i.i.d. over time and between antennas. The channel coefficients are distributed in the same manner. Therefore, we may define the nominal SNR between the source and a relay node by equation (2)'.

Now each link from a relay to the destination is single-input multiple-output channel (SIMO) with channel coefficients of equation (3)' for i=1, . . . , M.

We denote the symbols sent from the relays by $x_i(t)$ and assume that each active relay must satisfy the (individual) power constraint $E\{|x_i|\}=P_{r,i}$. For simplicity, we further assume that $P_{r,i}=P_r$ for all i.

Thus, signal received at the destination is given by by equation (4)', for t=1, . . . , T, and where $n_i(t)$ is i.i.d. CN (0, 1) (over space and time)

We note that with a slight abuse of notation we let t run from 1 to T in both phases of transmission. We define the nominal SNR between a relay node and the destination by by equation (5)'

We now describe the second phase of transmission. Each of the M' relays that have successfully decoded the message has access to the transmitted symbols x(t), t=1, . . . , T. Without loss of generality, we may assume that the relays with indices 1, . . . , M', are the "successful" relays.

We will only consider relaying operations that amount to applying a linear transformation to the received codeword. We do assume that buffering of symbols is possible and hence linear space-time modulation can be applied at the relay.

Nonetheless, for simplicity, we first describe the simplest setting (without buffering), in which case the operation done at each relay amounts to multiplying each codeword symbol by some complex number which we take to be independent of t. We denote this scalar by gi, i=1, . . . , M'.

Thus, the output of each relay is simply illustrated in equation (5.1)'.

It follows that the destination receives the signal illustrated in by equation (6)'.

Let us define equation (6.1)'.

It follows that the gains $g_i$ should be chosen such that $|g_i|=\alpha$. When considering more general space-time processing at the relays, (6)' is replaced with a corresponding matrix variant as will be explicitly described in the sequel.

We will compare the outage probability attained by different schemes and take as a figure of merit, the receive SNR attained at the destination node. This can be directly translated to outage probability for either uncoded transmission or coded transmission, depending on the stringency of the latency constraints. Both extremes will be analyzed.

In particular, in order to provide simple performance bounds, we will analyze the mutual information attained by a scheme, defined by by equation (7)'.

Correspondingly, for coded transmission (with long blocklength), outage is defined as the event where the mutual information is below the target rate $R_{tar}$, i.e. equation (8)'.

Receiver Equipped with a Single Antenna: Known Results

It has been shown that given a per-relay power constraint (this corresponds to a per antenna power constrains), the optimal beamforming vector which maximizes the received SNR is illustrated in equation (8)'.

Note that such beamforming is dual to equal-gain combining. We further note that in contrary to the assumption of full CSI at the transmitter, optimal beamforming subject to a per-antenna power constraint only makes use of local CSI (the phase of the forward channel) and hence can be employed in a distributed scenario.

When using (9)', the received signal is by equation (10)' and hence, the resulting SNR as illustrated in equation (12)'.

As a benchmark, we consider the optimal "centralized" beamforming vector as illustrated in equation (12)'.

This is the optimal beamforming that can be attained subject to a global constraint on the total power transmitted by all the active relays, The corresponding SNR is as illustrated in equation (13)'.

Receiver with Two Antennas: Performance Benchmark

Figure 22:
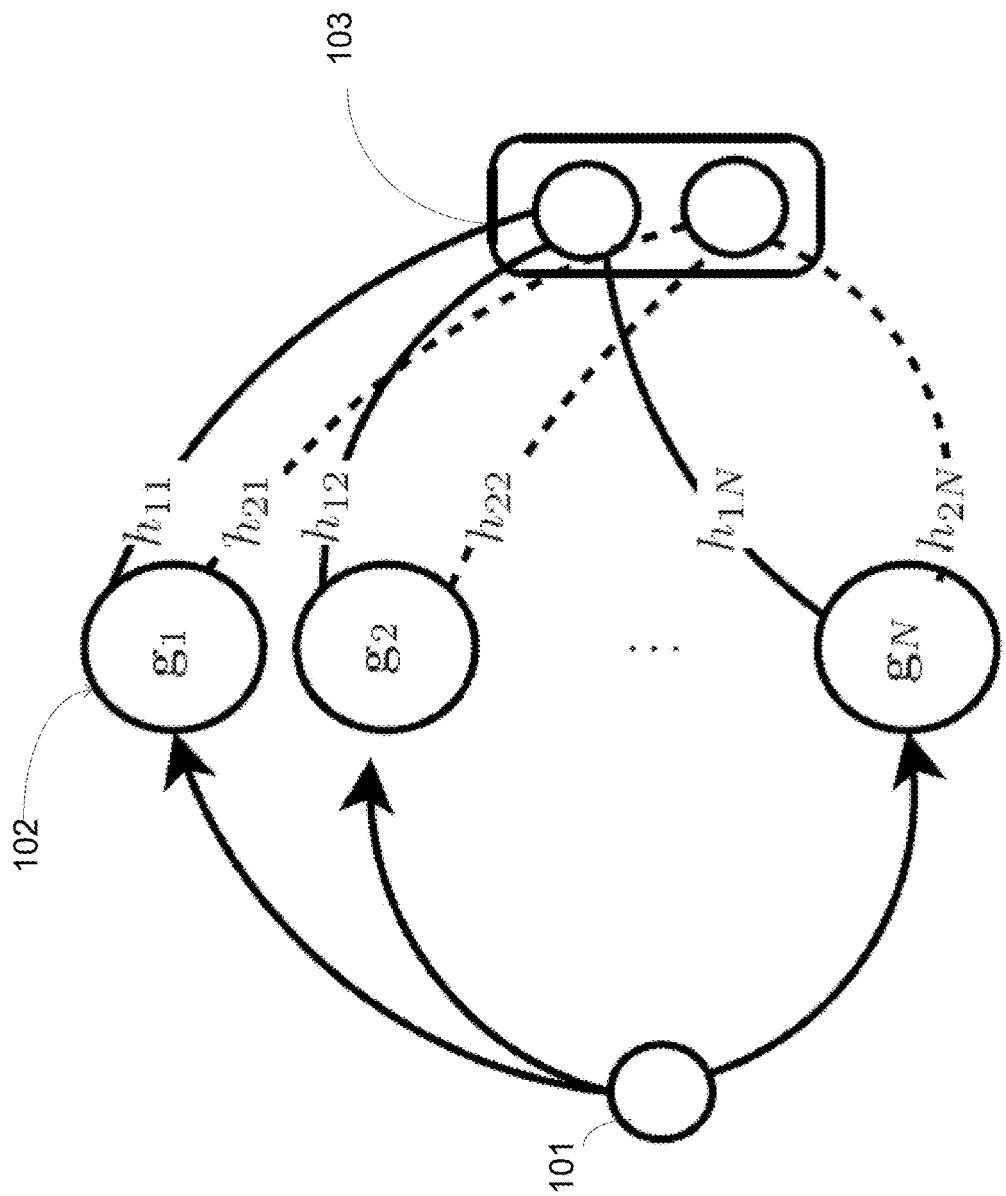
FIG. 22 is an example of a system.

We now return to the more general model where the destination node is equipped with $N_r>1$ antennas. Our focus is on the special case of $N_r=2$ as depicted in FIG. 22. Denoting the channels from relay i to the receiver as as illustrated in equation (14)', and the received signal is illustrated in equation (15)'.

We outline several potential transmission protocols for this scenario which will serve as benchmarks for comparison. The main attributes of all considered methods, as well as those of the scheme proposed in the present work, are summarized in Table I Arbitrary antenna selection: The simplest scheme is a receiver which arbitrarily a priori chooses to use only one antenna. Clearly, the performance is then identical to the case of having a receiver with single antenna as given above.

Optimal antenna selection: At the expense of increased latency, after the destination node sends a beacon signal from each antenna, the relays could try in sequence beamforming a pilot sequence, first to receive antenna 1 and then to receive antenna 2. Then, the destination node would choose the receive antenna with the higher SNR and notify the relays to which of the antennas they should perform beamforming, in a similar spirit to a 1-bit feedback scheme. Specifically, the beamforming vectors would be either one of those as illustrated in equation (15.1)'

The corresponding SNR as illustrated in equation (16)'.

The resulting SNR of such a selection protocol is as illustrated in equation (17)'.

The main drawback of this protocol is the significant latency it entails and further, the process where the destination informs of its choice of antenna is susceptible to errors. Nonetheless, we take it as a benchmark for performance comparison where we neglect possible feedback errors (w.r.t. the antenna chosen by the destination node).

Opportunistic relaying: As a further benchmark we also consider opportunistic relaying and which we now briefly recall.

As soon as each relay receives the clear-to-send packet, it starts a timer for a time which is proportional to the channel gain from the relay to the receiver. The timer of the relay with the best channel conditions will expire first. That relay transmits a short duration flag packet, signaling its presence. All relays, while waiting for their timer to expire are in listening mode. As soon as they hear another relay flagging its presence or forward information (the best relay), they back off. Assuming the receiver uses MRC, the SNR corresponding to this protocol is as illustrated in equation (18)'.

Where $h_i$ is defined in (14)'. While the array gain is lost, full diversity is achieved. An advantage of the scheme over the method that we propose is that the time synchronization between relays may be somewhat less stringent.

As another benchmark we consider a variant of opportunistic relaying with sum-power constraint, i.e. each relay attempts to transmit with power $M'P_r$. The resulting SNR in this case is as illustrated in equation (19)'.

Centralized Beamforming:

The optimal solution for transmission of a single stream over a MIMO channel subject to an aggregate power constraint is to transmit in the direction of the singular vector which corresponds to the strongest singular value.

Denote the singular value decomposition (SVD) of the channel between the relays and the receiver as illustrated in equation (20)', and the singular values by $d_i$.

Thus, the beamforming vector to be used is the one which corresponds to the stronger of the two non-zero singular values—as illustrated in equation (21)'.

Denoting $d_{max}$ as the maximal singular value, the resulting SNR is as illustrated in equation (22)'.

We note that this scheme requires an even higher level of cooperation as compared to the antenna selection protocol as each relay needs to know all channels between all relays and the receiver (or alternatively, a much greater amount of feedback from the receiver as it needs to update each relay on its beamforming coefficient). Furthermore, it does not satisfy a per-relay power constraint.

New Distributed Beamforming Protocol

The proposed method utilizes a recently developed universal diversity combining scheme that we employ as the front end of the destination node.

Unitary orthogonal diversity combining for a single user

Consider a 2×1 single-input multiple-output (SIMO) channel, with channel coefficients $h_1$ and $h_2$. The signal received at antenna i=1, 2, at discrete time t, is as illustrated in equation (23)'.

We assume that the noise $n_i(t)$ is .i.d. over space and time with samples that are circularly-symmetric complex Gaussian random variables with unit variance. We further assume the transmitted symbols are subject to the power constraint $E\{|x|^2\}=P_2$.

The scheme works on batches of two time instances and for our purposes, it will suffice to describe it for time instances t=1, 2. Let us stack the four complex samples received over T=2 time instances, two over each antenna, into an 8×1 real vector as illustrated in equation (24)'.

Where $x_R$ and $x_I$ denote the real and imaginary parts of a complex number x. We similarly define the stacked noise vector n. Likewise, we define x as illustrated in equation (25)'.

Next, we form a 4-dimensional real vector y by applying to the vector s the transformation as illustrated in equation (26)'. Wherein G is illustrated in equation (27)'.

Note that unlike conventional diversity-combining schemes, here the combining matrix G is universal, i.e., it does not depend on the channel coefficients.

It is readily shown that equation (28)' holds, where U (see equation (29)' is an orthonormal matrix for any h1, h2 and where n' is i.i.d. and Gaussian with variance 1/2.1

We may reconstruct (up to additive noise) the original samples by forming the relationship as illustrated in equation (30)', where n is also i.i.d. Gaussian with variance ½.

Since the dimension (over the reals) of y is four rather than eight, as is the dimension of the received signal s, we obtained a universal dimension-reducing combining scheme.

We consider now the scenario of a 2×K MIMO multiple-access channel (MIMO-MAC) where K users, each equipped with a single antenna, transmit to a common receiver that is equipped with two antennas.

We first recall the more general channel model of a MIMO-MAC with K users, where each transmitter has $N_t$ antennas and the receiver has $N_r$ antennas. The input/output relation can be expressed as illustrated in equation (31)'.

Where Hi is the channel matrix between user i and the receiver.

We assume isotropic ("white") transmission by each user and that all users are subject to the same power constraint P.

Now assume that the receiver applies as a front end the universal diversity combining transformation (26)'. Then by (28)' and (31)', in a multi-user scenario, the receiver output is given as illustrated in equation (32)', Where hi is defined in (14)' and U(h1i, h2i) is given by (29)'.

In the proposed scheme, the receiver applies the universal space-time diversity combining transformation (26)' on its input symbols. As described above, this is done by buffering symbols at odd times and applying the matrix G on pairs of symbols. Since we assume that each relay has perfect local CSI, each relay then simply "undos" its channel matrix.

Specifically, each relay transmits a signal as illustrated in equation (33)'.

Where x is defined in (25) and should be interpreted as two symbols transmitted from the source node and were accurately decoded at the relay and U is defined in (29)' Note that the per-antenna power constraint is satisfied.

Thus, at the receiver we obtain equation (34)'.

The resulting SNR is illustrated in equation (35)'.

This SNR is quite satisfying as it is clear that we obtain both the maximal diversity gain while also enjoying transmit-side array gain (but not receive side MRC gain). In fact, the attained performance is not far from that of the optimal selection benchmark (17)' as we formalize in the form of a theorem.

We compare the performance of different schemes when operating in a Rayleigh fading environment. As mentioned above, we consider the outage probability of the mutual information as well as the outage probability for uncoded transmission.

Figure 23:
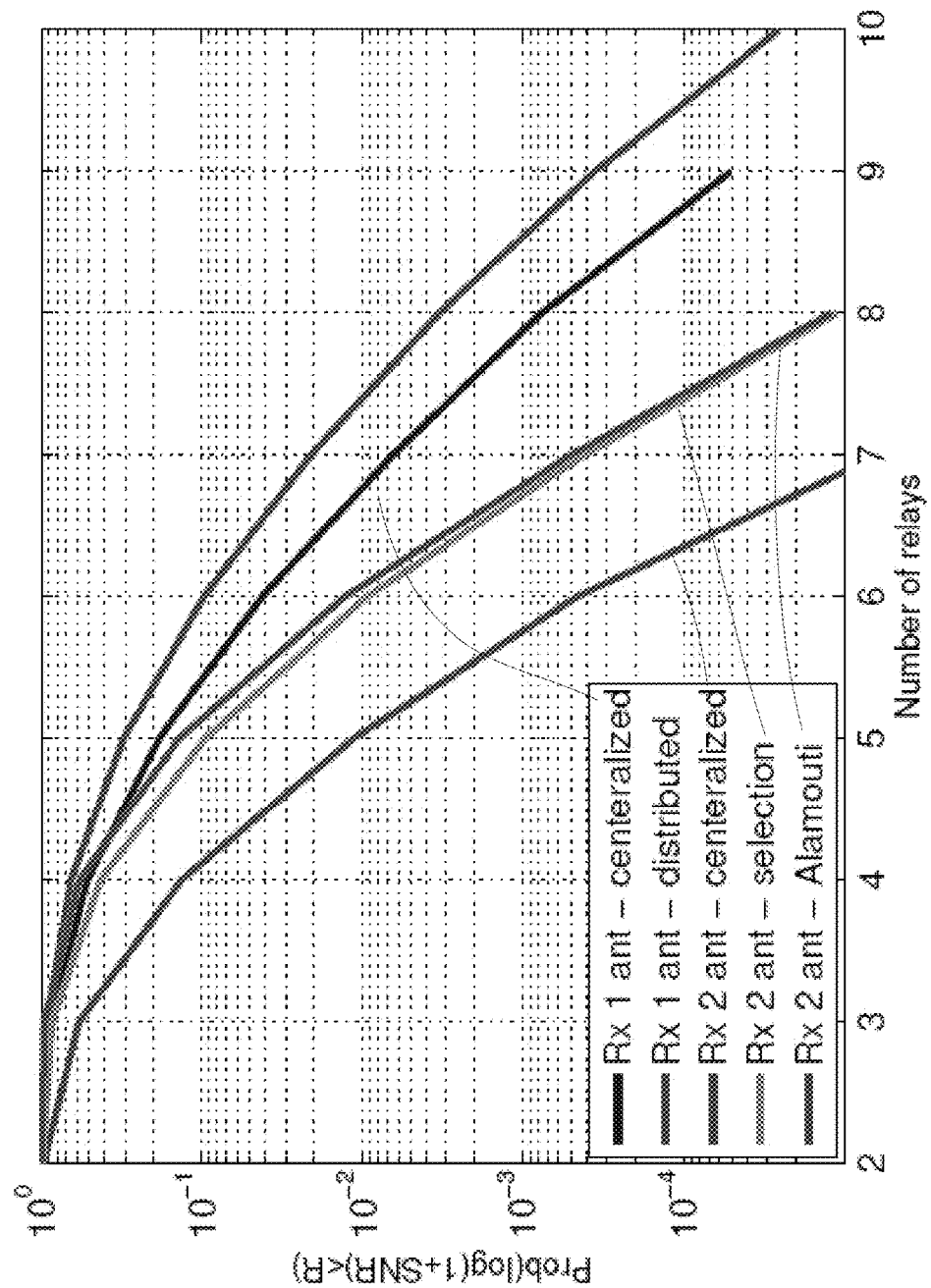
FIGS. 23-28 is examples of performances of various receivers.

We now compare the performance of different schemes over the second phase of transmission, for a given number of active relays M'. FIG. 23 (graph 93) depicts the outage probability of the mutual information for different topologies and schemes. First, the performance of a system with single-antenna receiver is shown. For this case, the performance of both distributed (phase-only) and the centralized beamforming benchmark is shown. We also plot the outage probability of a receiver equipped with two receive antennas. As can be seen, the performance of arbitrary selection coincides with the distributed beamforming for single antenna.

The performance of both methods satisfying the per-relay constraint (i.e., the selection benchmark and the proposed new method) is inferior to that of centralized beamforming (which is not feasible in a distributed setting), yet it is superior to the opportunistic relaying (even when comparing to the variant with the sum-power constraint). We further note that the performance of the suggested method is very close to the performance of the selection benchmark while enjoying the benefits mentioned in TABLE 1 of FIG. 39.

As expected, the new method offers significant benefits in terms of the number of active relays needed to meet a given outage probability when compared to single-receive antenna setting, even when considering those benchmarks which do not meet the per-relay power constraint. At the same time, the new scheme does not suffer from the drawbacks associated with the selection scheme, while incurring only a minimal penalty.

Figure 24:
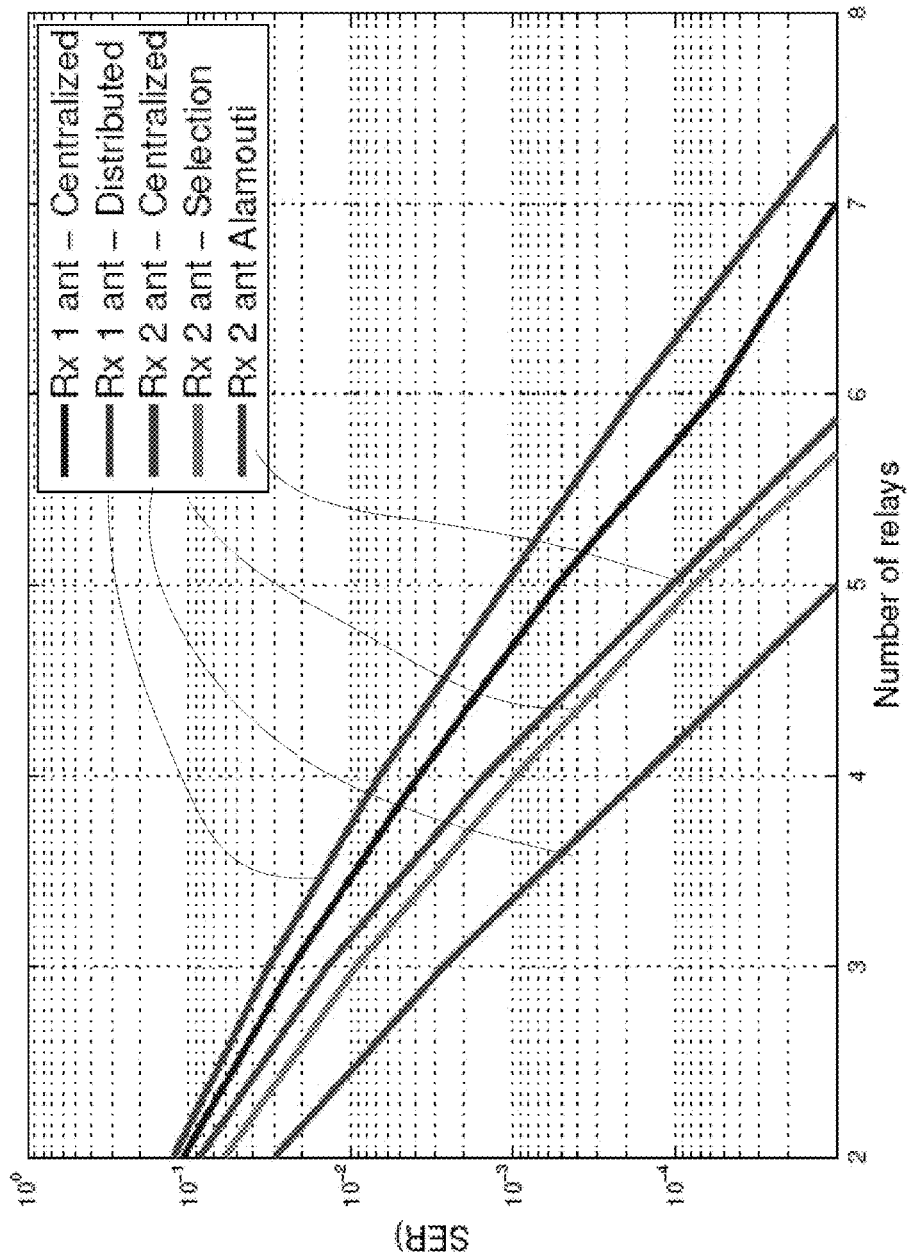

FIG. 24 (graph 94) depicts the outage probability for uncoded QPSK. As can be seen, the same trends hold also in this case.

Figure 25:
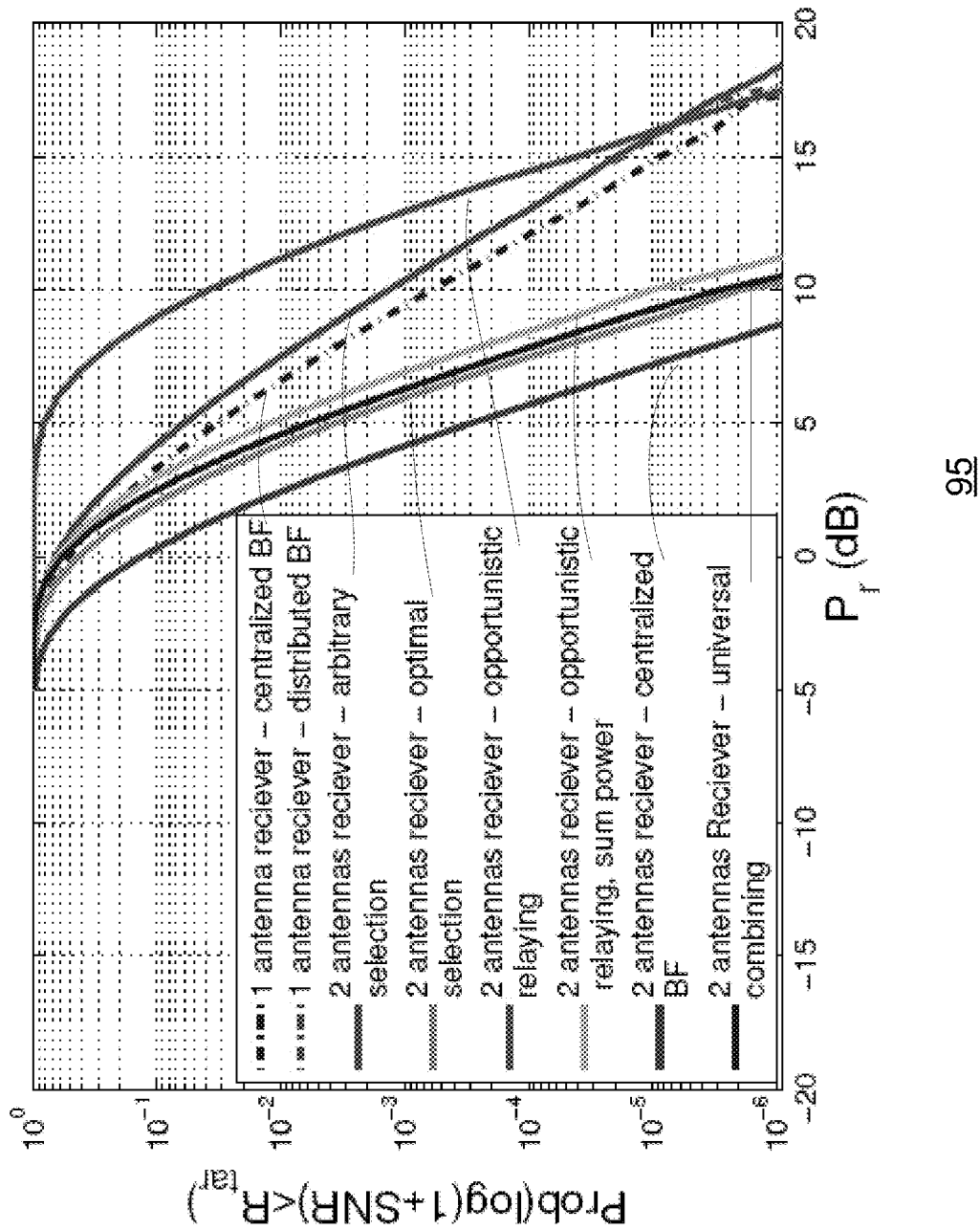
Figure 26:
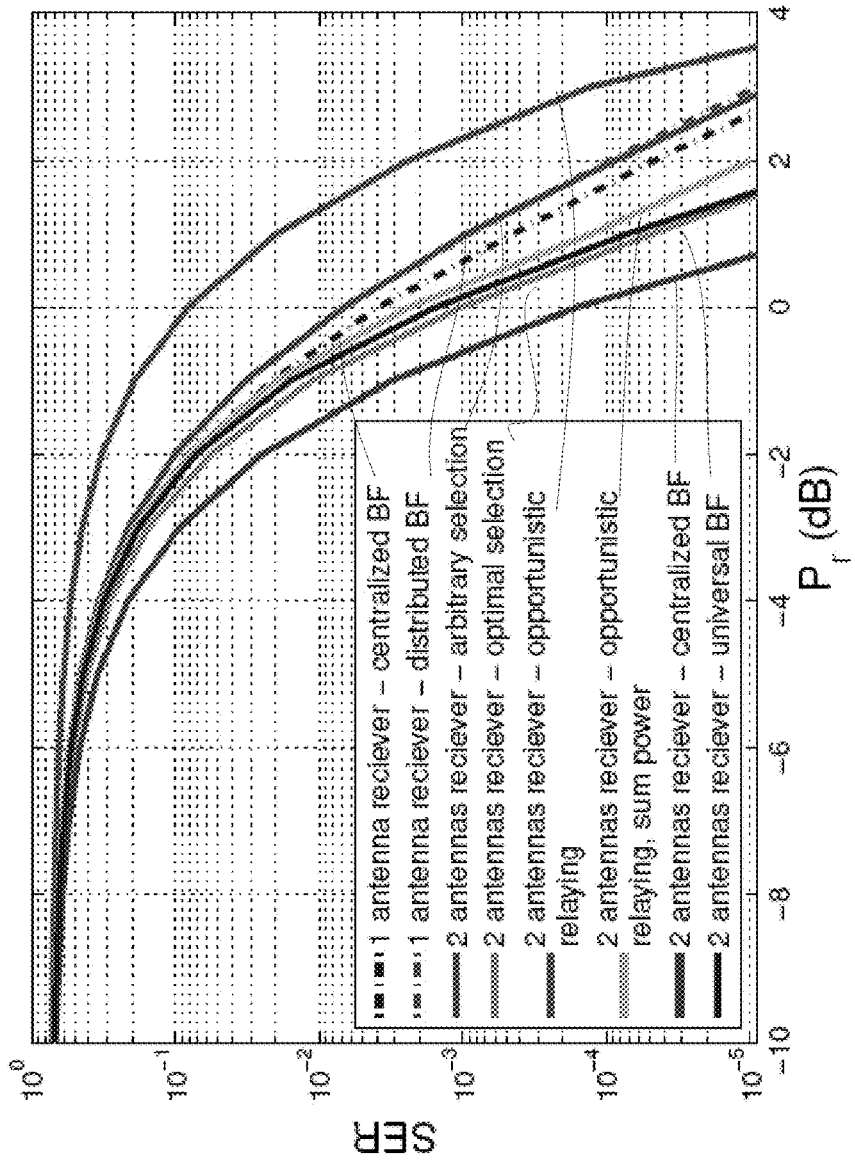

FIGS. 25 (graph 95) and 26 (graph 96) show the behavior of different schemes for a given number of active relays M' as a function of $P_r$. In these figures we take M'=4. Again, the outage probability of the mutual information is depicted in FIG. 25 whereas the symbol error rate of uncoded transmission is depicted in FIG. 26.

End-to-End Simulation

Figure 27:
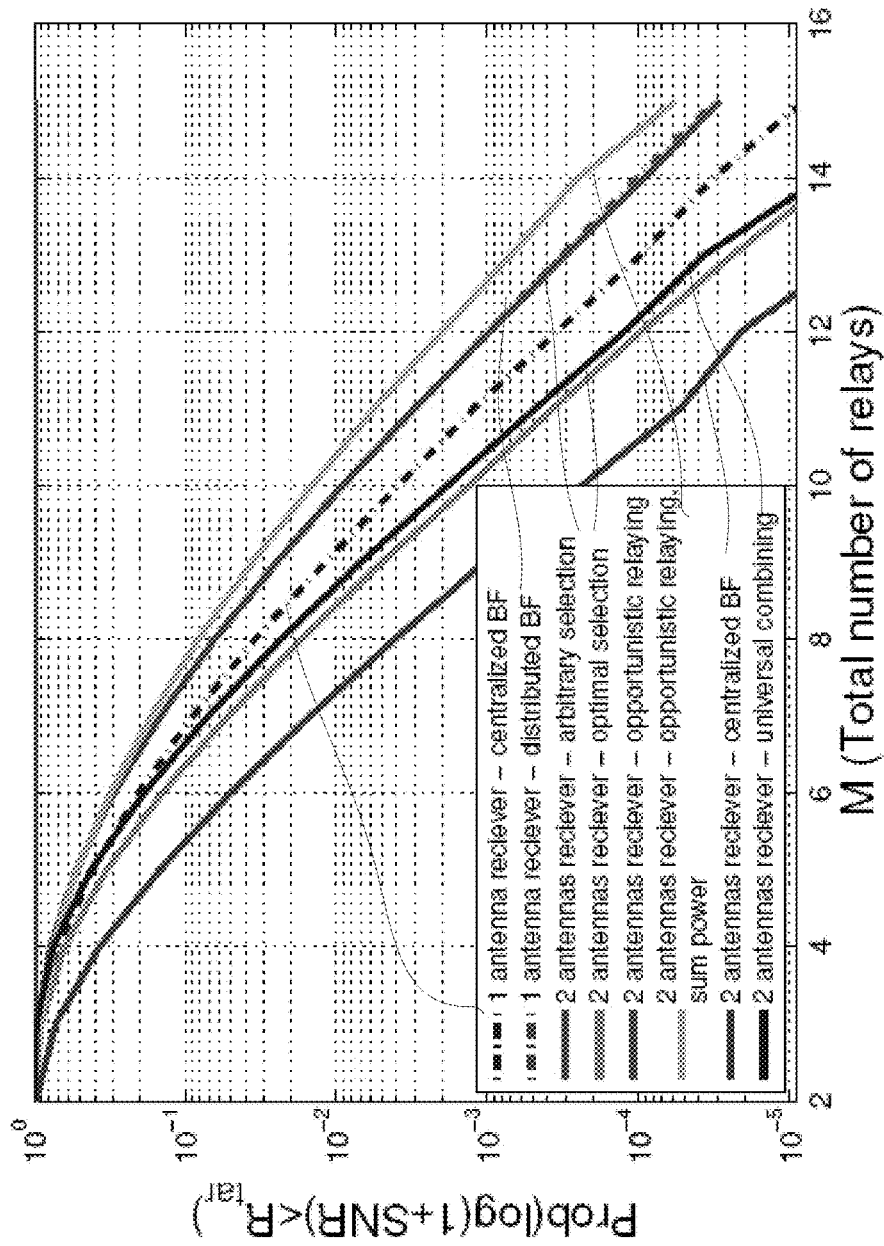
Figure 28:
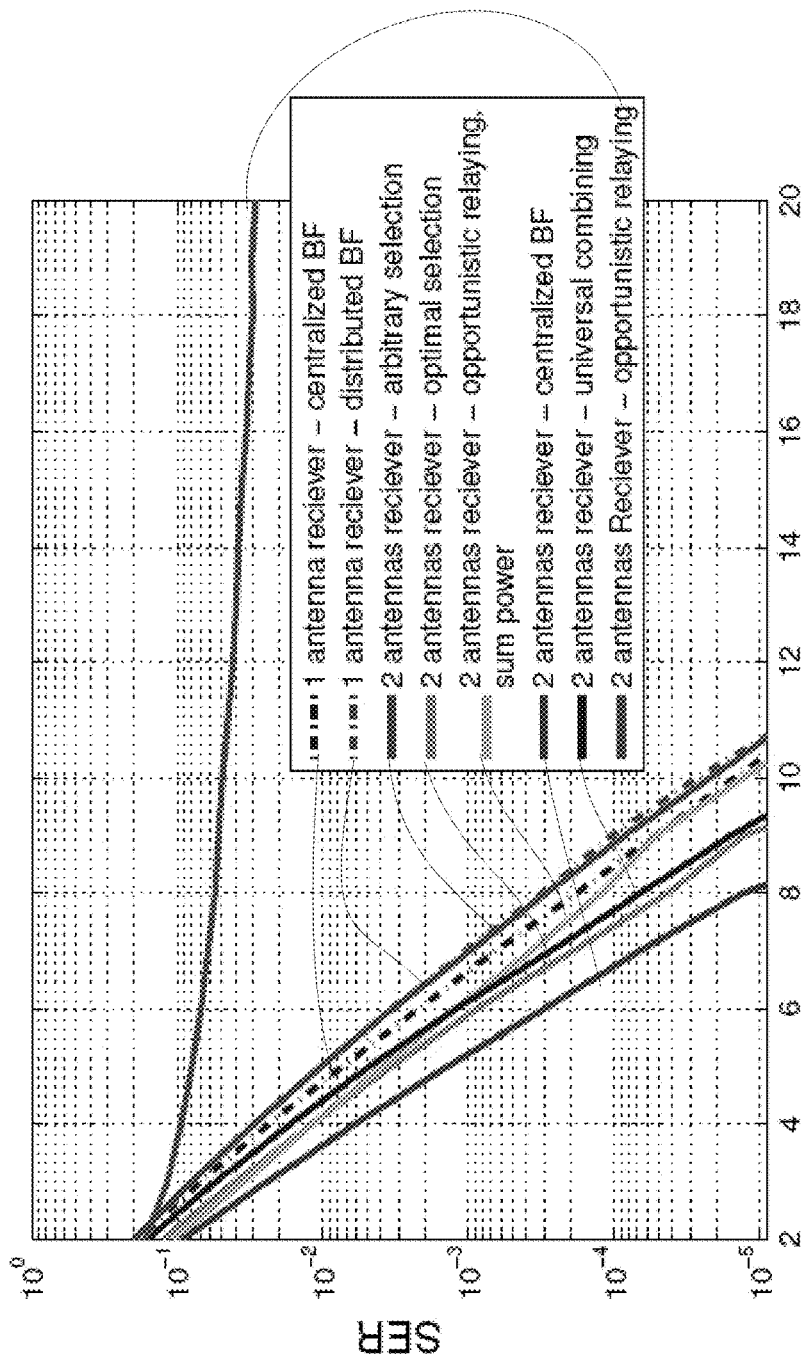

We now simulate the end-to-end performance when both phases of transmission are in operation. That is, we now include the first hop in the simulation. FIGS. 27 (graph 97) and 28 (graph 98) show the behavior of different schemes for different number of maximal possible relays M, when $P_s$=20 dB and $P_r$=0 dB. In these figures the number of active relays M' is a random variable which depends on the SNR of the links between the source node and the relays.

We have introduced a novel distributed beamforming scheme with enhanced diversity for systems where the receiver is equipped with two antennas. The key ingredient is having the receiver employ a universal space-time diversity combining as a front end operation, along with simple unitary precoding at the relays who utilize only local channel state information. The scheme allows to enjoy both full diversity as well as array gain. An interesting avenue for further research is extending the results to receivers equipped with more than two antennas. A possible avenue for such an extension is the use of more general orthogonal space-time block codes or quasi-orthogonal codes to generate the space-time diversity combining transformations.

Figure 41:
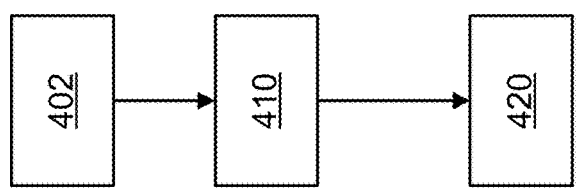
FIG. 41 is an example of a method.

FIG. 41 illustrates method 400.

Method 400 may include step 410 of receiving, by multiple reception elements of a receiver, received signals that may be received with diversity and represent signals that originated from a signal source.

The signal source may or may not be a transmitter with antennas. The multiple reception elements may or may not be antennas, as they may be any type of sensors or any type of receiving elements.

Step 410 may be followed by step 420 of processing, by at least one processor of the receiver, the received signals to provide processed signals that may be indicative of the signals that originated from the signal source.

Step 420 may include applying any process illustrated above.

The processing may include performing a dimension-reducing process that may be channel independent on a set of signals received at multiple points of time by each reception element of the multiple reception elements.

The performing of the dimension reduction process may include applying linear operations that may be channel independent.

The dimension reducing process may be a dimension reducing linear space-time process.

The dimension reducing process may be a dimension reducing semi-orthogonal linear space-time process.

The dimension reducing process may be a dimension reducing space-frequency process.

The performing of the dimension reduction process may include applying a dimension reduction matrix that may be channel independent.

The transpose of the dimension reduction matrix represents a linear operation performed by an Alamouti modulation, expressed over real values, applied to the received signals.

The a set of signals of two points in time and for two reception elements the dimension reduction matrix may be matrix S mentioned above—it may have has four rows and eight columns, wherein the first row includes 1/sqr(2), . . . , 1/sqr(2); wherein the second row includes, 1/sqr(2), . . . , −1/sqr(2); wherein the third row includes, . . . , 1/sqr(2), −1/sqr(2), . . . ; and wherein the fourth row includes, . . . , 1/sqr(2), . . . , 1/sqr(2), . . . , and.

The for a set of signals of two points in time and for two reception elements the dimension reduction matrix equals a multiplication by at least one orthogonal matrix (multiplication to the right, to the left or both) by a matrix that has four rows and eight columns, wherein the first row includes 1/sqr(2), . . . , 1/sqr(2); wherein the second row includes, 1/sqr(2), . . . , −1/sqr(2); wherein the third row includes, . . . , 1/sqr(2), . . . , −1/sqr(2), . . . ; and wherein the fourth row includes, . . . , 1/sqr(2), . . . , 1/sqr(2), . . . , and.

The for a set of signals of two points in time and for two reception elements the dimension reduction operation may be done over the complex field.

The performing of the dimension reduction process may include applying linear operations and conjunction operations that may be channel independent.

Figure 40:
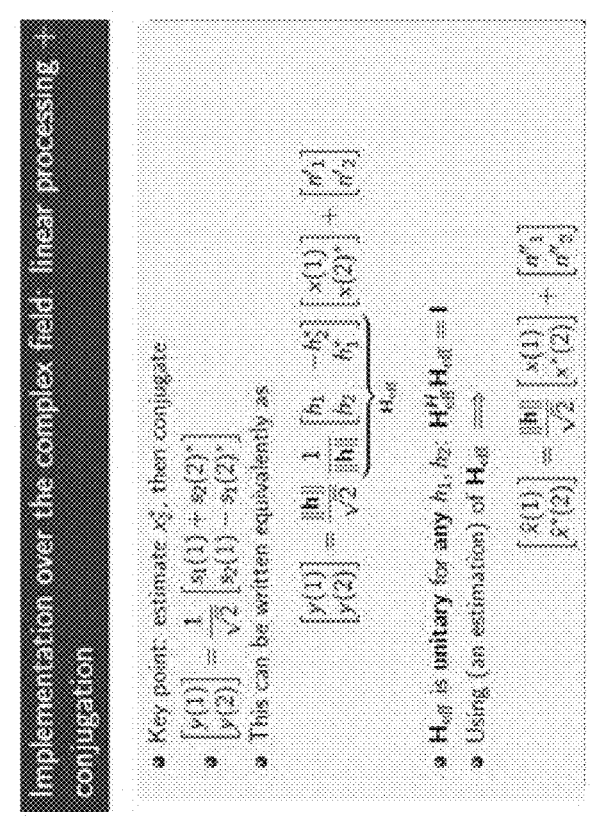

For complex received signals (see for example FIG. 40)—for a set of signals that may include of two points in time and for two reception elements the applying linear operations and conjunction operations may include (a) summing a signal received by a first reception element at a first point of time with a conjunction of a signal received by a second reception element at a second point of time, and (b) subtracting from a signal received by the second reception element at the first point of time, a conjunction of a signal received by the first reception element at a second point of time.

The multiple reception elements of the receiver may be multiple antennas and wherein the signals that originated from the signal source may be transmitted signals.

The multiple antennas may consist a pair of antennas.

The multiple antennas may include more than two antennas.

The processing may include performing analog to digital conversion.

The analog to digital conversion may be executed by a group of at least one analog to digital converter; wherein a number of analog to digital converters of the group may be smaller than a number of the multiple antennas.

The the preforming of the analog to digital conversion may precede the applying of the dimension-reducing space-time process.

The applying of the dimension-reducing space-time process may start before the preforming of the analog to digital conversion.

Performing the applying of the dimension-reducing space-time process in the analog domain may allow using cheap and compact analog receivers that may communicate with more powerful digital processors.

The set of signals may have a first number (N1) of real and imaginary parts of the received signals that were received at the multiple points in time; and the method may include multiplying the set of signals by the dimension reducing matrix to provide a reduced set of signals that has a second number (N2) of intermediate signals; wherein N1 exceeds N2; wherein the dimension reduction matrix has orthogonal rows.

The method may include analog to digital converting the intermediate signals to provide the processed signals.

The method may include reconstructing, by the receiver, the signals that originated from the signal source based on the processed signals.

The method may include reconstructing, by a computerized system that differs from the receiver, the signals originated from a signal source based on the processed signals.

The method may include analog to digital converting the intermediate signals to provide digital signals; and reconstructing, by the receiver, the signals to provide the processed signals, based on the digital signals.

The method may include applying a dimension reduction matrix the at a digital domain of the receiver.

The method may include applying a dimension reduction matrix the at an analog domain of the receiver.

The method may include analog to digital converting the processed signals to provide digital processed signals.

The method may include sending the digital processed signals to device that does not include the receiver.

The method may include processing the digital processed signals by the receiver to reconstruct the signals that originated from the signal source based on the processed signals Step 410 may be preceded by preliminary step 402 of estimating channels between a relay unit and the receiver to provide channel estimates; receiving, by the relay unit, intermediate signals that represent the signals that originated from the signal source; processing the intermediate signals based on the channel estimates to provide relay processed signals; and transmitting the relay processed signals to the receiver.

The method may include estimating channels between relay units and the receiver to provide channel estimates; receiving, by the relay units, intermediate signals that represent the signals that originated from the signal source; processing the intermediate signals based on the channel estimates to provide relay processed signals; and transmitting the relay processed signals to the receiver.

Each terminal may estimate the channel from itself to the destination.

Each terminal may estimate the channel from itself to the destination invoking the electromagnetic reciprocity principle by utilizing a beacon signal of known parameters.

The preprocessing applied at each terminal may be such that the resulting channel between the terminal and the receiver, after applying the dimension reduction transformation, may be a scaled identity matrix.

The multiple reception elements may be multiple antennas; and wherein the estimating of the channels between the relay unit and the receiver may include receiving from the multiple antennas and by the relay unit, a beacon signal of known parameters; and processing the beacon signal to estimate the channels between the relay unit and the receiver.

Any reference to "may be" is applied mutatis mutandis to "may not be".

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

Any of the methods may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments such as other parallel processing methods.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, clusters of computers, or commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method comprising:
    receiving, by multiple reception elements of a receiver, received signals that are received with diversity and represent signals that originated from a signal source; and
    processing, by at least one processor of the receiver, the received signals to provide processed signals that are indicative of the signals that originated from the signal source;
    wherein the processing comprises performing a dimension-reducing process that is channel independent on a set of signals received at multiple points of time by each reception element of the multiple reception elements.

2. The method according to claim 1 wherein the performing of the dimension reduction process comprises applying linear operations that are channel independent.

3. The method according to claim 1 wherein the dimension reducing process is a dimension reducing linear space-time process.

4. The method according to claim 1 wherein the dimension reducing process is a dimension reducing semi-orthogonal linear space-time process.

5. The method according to claim 1 wherein the dimension reducing process is a dimension reducing space-frequency process.

6. The method according to claim 1 wherein the performing of the dimension reduction process comprises applying a dimension reduction matrix that is channel independent.

7. The method according to claim 6 wherein a transpose of the dimension reduction matrix represents a linear operation performed by an Alamouti modulation, expressed over real values, applied to the received signals.

8. The method according to claim 7 wherein for a set of signals of two points in time and for two reception elements the dimension reduction matrix has four rows and eight columns, wherein the first row includes 1/sqr(2), 0, 0, 0, 0, 0, 1/sqr(2), 0; wherein the second row includes 0, 1/sqr(2), 0, 0, 0, 0, 0, −1/sqr(2); wherein the third row includes 0, 0, 1/sqr(2), 0, −1/sqr(2), 0, 0, 0; and wherein the fourth row includes 0, 0, 0, 1/sqr(2), 0, 1/sqr(2), 0, and 0.

9. The method according to claim 1 wherein for a set of signals of two points in time and for two reception elements the dimension reduction operation is done over the complex field.

10. The method according to claim 1 wherein the performing of the dimension reduction process comprises applying linear operations and conjunction operations that are channel independent.

11. The method according to claim 10 wherein for a set of signals that comprises of two points in time and for two reception elements the applying linear operations and conjunction operations comprises (a) summing a signal received by a first reception element at a first point of time with a conjunction of a signal received by a second reception element at a second point of time, and (b) subtracting from a signal received by the second reception element at the first point of time, a conjunction of a signal received by the first reception element at a second point of time.

12. The method according to claim 1 wherein the multiple reception elements of the receiver are multiple antennas and wherein the signals that originated from the signal source are transmitted signals.

13. The method according to claim 1 wherein the processing comprises performing analog to digital conversion.

14. The method according to claim 13, wherein the analog to digital conversion is executed by a group of at least one analog to digital converter; wherein a number of analog to digital converters of the group is smaller than a number of the multiple antennas.

15. The method according to claim 13, wherein the preforming of the analog to digital conversion precedes the applying of the dimension-reducing space-time process.

16. The method according to claim 13, wherein the applying of the dimension-reducing space-time process starts before the preforming of the analog to digital conversion.

17. The method according to claim 1, wherein the set of signals has a first number (N1) of real and imaginary parts of the received signals that were received at the multiple points in time; and wherein the method comprises multiplying the set of signals by the dimension reducing matrix to provide a reduced set of signals that has a second number (N2) of intermediate signals; wherein N1 exceeds N2; wherein the dimension reduction matrix has orthogonal rows.

18. The method according to claim 1 comprising applying a dimension reduction matrix the at a digital domain of the receiver.

19. The method according to claim 1 comprising applying a dimension reduction matrix the at an analog domain of the receiver.

20. The method according to claim 1 comprising estimating channels between a relay unit and the receiver to provide channel estimates; receiving, by the relay unit, intermediate signals that represent the signals that originated from the signal source; processing the intermediate signals based on the channel estimates to provide relay processed signals; and transmitting the relay processed signals to the receiver.

21. The method according to claim 20 wherein the multiple reception elements are multiple antennas; and wherein the estimating of the channels between the relay unit and the receiver comprises receiving from the multiple antennas and by the relay unit, a beacon signal of known parameters; and processing the beacon signal to estimate the channels between the relay unit and the receiver.

22. The method according to claim 1 comprising estimating channels between relay units and the receiver to provide channel estimates; receiving, by the relay units, intermediate signals that represent the signals that originated from the signal source; processing the intermediate signals based on the channel estimates to provide relay processed signals; and transmitting the relay processed signals to the receiver.

23. The method according to claim 22 comprising estimating by each relay unit the channel from itself to the destination.

24. The method according to claim 23 comprising estimating by each relay unit the channel from itself to the destination invoking the electromagnetic reciprocity principle by utilizing a beacon signal of known parameters.

25. The method according to claim 22 wherein following a processing by each relay unit, the channel between the relay units and the receiver, after applying the dimension reduction transformation, is represented by a scaled identity matrix.

26. A receiver, comprising:
multiple reception elements that are configured to receive, received signals that are received with diversity and represent signals that originated from a signal source; and
at least one processor that is configured to process the received signals to provide processed signals that are indicative of the signals that originated from the signal source;
wherein the processing comprises performing a dimension-reducing process that is channel independent on a set of signals received at multiple points of time by each reception element of the multiple reception elements.

27. A non-transitory computer readable medium that stores instructions that once executed by a receiver causes the receiver to:
receive, by multiple reception elements, received signals that are received with diversity and represent signals that originated from a signal source; and
process, by at least one processor, the received signals to provide processed signals that are indicative of the signals that originated from the signal source;
wherein the processing comprises performing a dimension-reducing process that is channel independent on a set of signals received at multiple points of time by each reception element of the multiple reception elements.

* * * * *